(12) United States Patent
Narumi et al.

(10) Patent No.: US 12,591,044 B2
(45) Date of Patent: Mar. 31, 2026

(54) LIGHT PROJECTION APPARATUS AND MOVING BODY

(71) Applicant: Panasonic Intellectual Property Management Co., Ltd., Osaka (JP)

(72) Inventors: Kenji Narumi, Osaka (JP); Akira Hashiya, Osaka (JP); Tokuzou Kiyohara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 962 days.

(21) Appl. No.: 17/806,507

(22) Filed: Jun. 13, 2022

(65) Prior Publication Data

US 2022/0317259 A1 Oct. 6, 2022

Related U.S. Application Data

(63) Continuation of application No. PCT/JP2020/040011, filed on Oct. 23, 2020.

(30) Foreign Application Priority Data

Jan. 16, 2020 (JP) ................................. 2020-005282

(51) Int. Cl.
*G01S 7/481* (2006.01)
*F21V 7/00* (2006.01)
*G01S 17/931* (2020.01)

(52) U.S. Cl.
CPC .......... *G01S 7/4814* (2013.01); *F21V 7/0033* (2013.01); *G01S 7/4818* (2013.01); *G01S 17/931* (2020.01); *F21V 2200/20* (2015.01)

(58) Field of Classification Search
CPC .... G01S 7/4814; G01S 7/4818; G01S 17/931; G01S 7/4817; F21V 7/0033; F21V 2200/20; G02F 1/295
See application file for complete search history.

(56) References Cited

U.S. PATENT DOCUMENTS 4,468,092 A * 8/1984 Inoue ................... G03B 21/625
                                                        359/457
8,109,638 B2 * 2/2012 Chen .................... G03B 21/208
                                                        353/31

(Continued)

FOREIGN PATENT DOCUMENTS

CN       110537143 A       12/2019
DE   102015115101 A1 *   3/2017   ........... G01S 17/894

(Continued)

OTHER PUBLICATIONS

DE 102015115101 A1 English (Year: 2017).*

(Continued)

*Primary Examiner* — Luke D Ratcliffe
*Assistant Examiner* — Jempson Noel
(74) *Attorney, Agent, or Firm* — Rimon P.C.

(57) ABSTRACT

A light projection apparatus includes a first mirror and a second mirror facing each other and extending in a first direction and an optical waveguide layer being located between the first mirror and the second mirror, having a structure in which a refractive index and/or a thickness can be changed, and guiding light in the first direction. The first mirror has light transmissivity higher than that of the second mirror, at least part of the light propagating in the optical waveguide layer is emitted outside therefrom, and an emission angle of light to be emitted from the first mirror can be changed in a range from an angle $\theta_1$ to an angle $\theta_2$ ($>\theta_1$) by the refractive index and/or the thickness of the optical waveguide layer being changed. First light emitted at the angle $\theta_1$ is projected vertically downward relative to second light emitted at the angle $\theta_2$.

10 Claims, 15 Drawing Sheets

(56)                    References Cited

U.S. PATENT DOCUMENTS

| | | | |
|---|---|---|---|
| 8,408,775 B1 * | 4/2013 | Coleman | G02F 1/133526 |
| | | | 362/616 |
| 8,995,038 B1 * | 3/2015 | Anderson | G02B 26/02 |
| | | | 359/227 |
| 2013/0342822 A1 * | 12/2013 | Shiraishi | G01S 7/4817 |
| | | | 356/4.01 |
| 2015/0146189 A1 * | 5/2015 | Kim | G01S 17/931 |
| | | | 356/4.01 |
| 2016/0274222 A1 * | 9/2016 | Yeun | G01S 7/4817 |
| 2018/0224709 A1 | 8/2018 | Inada et al. | |
| 2018/0267150 A1 * | 9/2018 | Inada | G02B 6/005 |
| 2018/0284237 A1 * | 10/2018 | Campbell | G01S 17/931 |
| 2018/0372951 A1 | 12/2018 | Hashiya et al. | |
| 2019/0004393 A1 | 1/2019 | Hashiya et al. | |
| 2019/0033522 A1 | 1/2019 | Baba et al. | |
| 2020/0025882 A1 * | 1/2020 | Watanabe | G01S 17/10 |
| 2020/0310217 A1 | 10/2020 | Inada et al. | |
| 2020/0408884 A1 | 12/2020 | Nakamura et al. | |

FOREIGN PATENT DOCUMENTS

| | | | |
|---|---|---|---|
| JP | 3-014477 U | 2/1991 | |
| JP | 5-205199 | 8/1993 | |
| JP | 2000-075030 | 3/2000 | |
| JP | 2008-102191 | 5/2008 | |
| JP | 2018-128663 | 8/2018 | |
| JP | 2019-023703 | 2/2019 | |
| WO | 2017/126386 | 7/2017 | |
| WO | 2018/061231 | 4/2018 | |
| WO | 2018/061515 | 4/2018 | |
| WO | 2019/130721 | 7/2019 | |
| WO | 2019/187777 | 10/2019 | |

OTHER PUBLICATIONS

International Search Report of PCT application No. PCT/JP2020/040011 dated Dec. 8, 2020.

Xiaodong Gu et al., "Beam-steering in hollow ZrO2/SiO2 distributed Bragg reflector waveguides for one-dimensional RGB imaging", Japanese Journal of Applied Physics 53, 030302-1-030302-3 (2014).

English Translation of Chinese Search Report dated Feb. 26, 2025 for the related Chinese Patent Application No. 202080089698.2.

* cited by examiner

LIGHT PROJECTION APPARATUS AND MOVING BODY

BACKGROUND

1. Technical Field

The present disclosure relates to a light projection apparatus and a moving body.

2. Description of the Related Art

Various devices for measuring a distance to a target object included in a scene by scanning the scene with a projected light beam and detecting reflected light from the target object have heretofore been proposed (see Japanese Unexamined Patent Application Publication No. 2018-128663 and U.S. Patent Application Publication No. 2018/0224709, for example).

SUMMARY

One non-limiting and exemplary embodiment provides a light projection apparatus which is capable of increasing a detectable distance of a target object located at a long distance and suppressing saturation of a detection signal of a target object located at a short distance.

In one general aspect, the techniques disclosed here feature a light projection apparatus including: a light deflection device including a first mirror and a second mirror which face each other and extend in a first direction, and an optical waveguide layer which is located between the first mirror and the second mirror, guides light in the first direction, and has a structure in which at least one of a refractive index or a thickness is capable of being changed, in which the first mirror has light transmissivity higher than light transmissivity of the second mirror and includes a light emission surface from which at least part of the light propagating in the optical waveguide layer is emitted outside, an emission angle of light to be emitted from the light emission surface of the first mirror is capable of being changed in a range from an emission angle $\theta_1$ to an emission angle $\theta_2$ being larger than the emission angle $\theta_1$ by at least one of the refractive index or the thickness of the optical waveguide layer being changed, and the light deflection device is disposed such that first light emitted at the emission angle $\theta_1$ from the light emission surface is projected vertically downward relative to second light emitted at the emission angle $\theta_2$ from the light emission surface.

According to the technique of the present disclosure, it is possible to realize a light projection apparatus, which is capable of increasing a detectable distance of a target object located at a long distance and suppressing saturation of a detection signal of a target object located at a short distance.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Underlying knowledge forming the basis of the present disclosure will be discussed prior to a description of an embodiment of the present disclosure.

Figure 1:
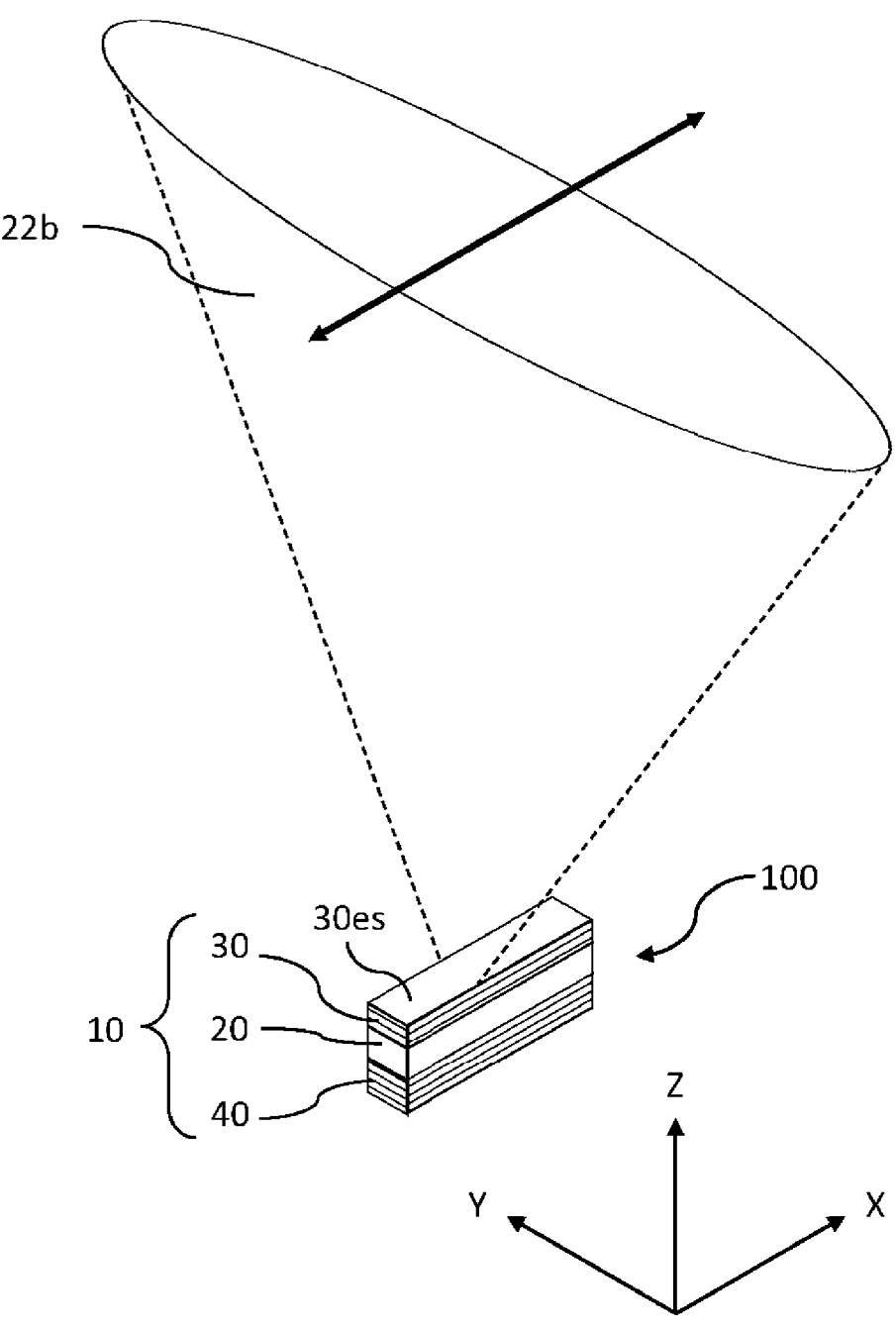
FIG. 1 is a perspective view schematically illustrating an example of a structure included in a light projection apparatus according to an exemplary embodiment.
Figure 2:
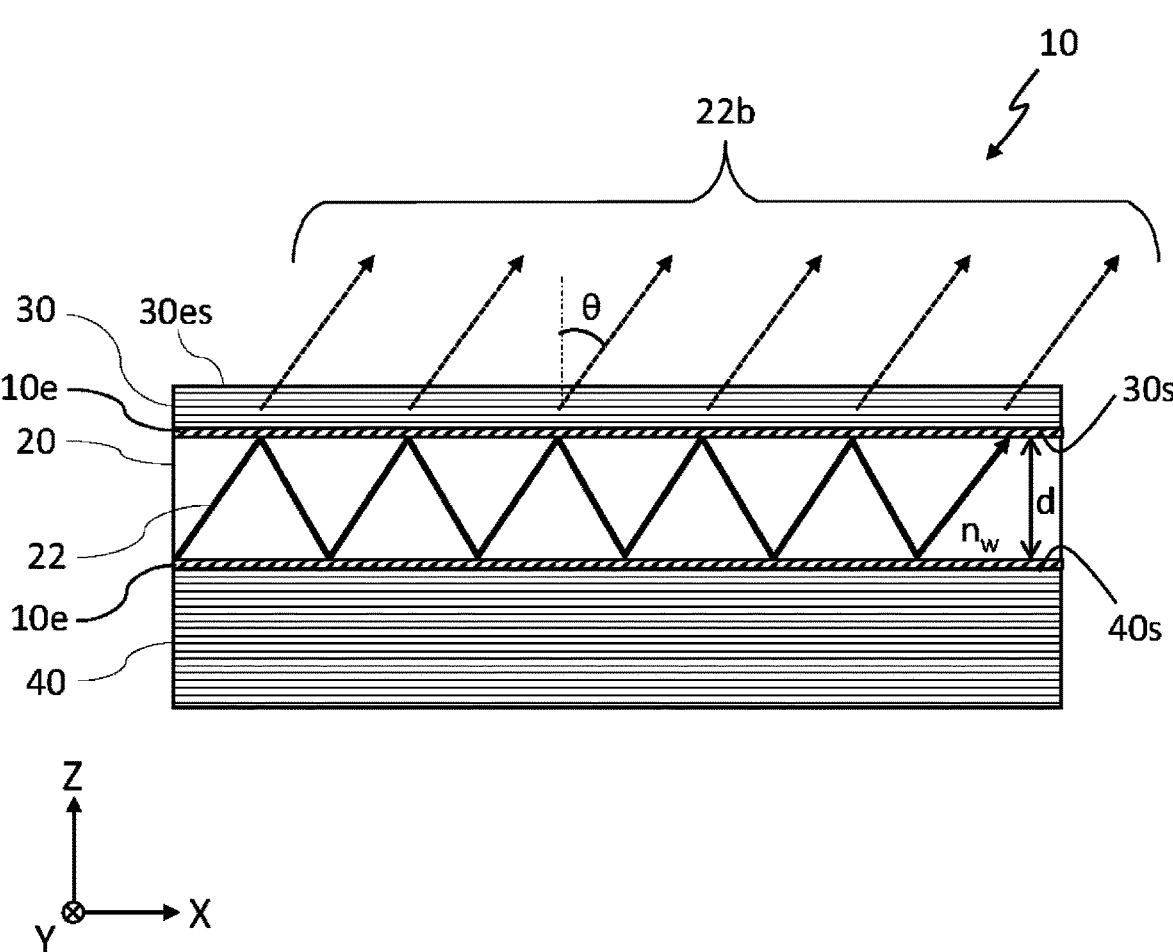
FIG. 2 is a diagram of a configuration illustrated in FIG. 1, which is viewed in +Y direction.

FIG. 1 is a perspective view schematically illustrating an example of a structure included in a light projection apparatus 100 according to an exemplary embodiment. FIG. 2 is a diagram of a configuration illustrated in FIG. 1, which is viewed in +Y direction. X axis, Y axis, and Z axis which are orthogonal to one another are schematically illustrated for reference. In this specification, the direction an arrow of each axis indicates is defined as + direction and the direction opposite thereto is defined as − direction. It is to be noted, however, that these definitions are merely used for the purpose of facilitating the explanations and are not intended to restrict the orientation when a light deflection device 10 is put into use. Moreover, shapes and sizes of all or part of structures illustrated in the drawings are not intended to restrict actual shapes and sizes.

The light projection apparatus 100 includes at least one light deflection device 10. The light deflection device 10 emits in a predetermined direction a light beam emitted by a not-illustrated light source. The light deflection device 10 includes a first mirror 30, a second mirror 40, and an optical waveguide layer 20. The first mirror 30 and the second mirror 40 face each other and extend in X direction. The first mirror 30 is disposed at a position located in +Z direction relative to the second mirror 40. Transmissivity of the first mirror 30 is higher than transmissivity of the second mirror 40. At least one of the first mirror 30 and the second mirror 40 can be formed from, for example, a multilayer reflective film in which high refractive index layers and low refractive index layers are alternately laminated on one another. The first mirror 30 and the second mirror 40 can be formed from respective multilayer reflective films including the same high refractive index layers and the same low refractive index layers. In this case, the transmissivity of the first mirror 30 becomes higher than the transmissivity of the second mirror 40 when the number of laminated layers in the first mirror 30 is set less than the number of laminated layers in the second mirror 40. The optical waveguide layer 20 is located between the first mirror 30 and the second mirror 40.

The first mirror 30 includes a light emission surface 30es which is parallel to XY plane and is on the side opposite the optical waveguide layer 20. Light 22 is propagates in the optical waveguide layer 20 in X direction while being reflected from the first mirror 30 and the second mirror 40. In the propagation, part of the light 22 is emitted outside as a light beam 22b from the light emission surface 30es. A direction of a center axis of the light beam 22b depends on a refractive index and/or a thickness of the optical waveguide layer 20. In this specification, the direction of the center axis of the light beam 22b will be simply referred to as the "direction of emission of the light beam 22b".

The optical waveguide layer 20 can have a structure in which the refractive index and/or the thickness varies depending on a change in drive voltage to be applied thereto. In the example illustrated in FIG. 2, the optical waveguide layer 20 includes a liquid crystal material, and two electrodes 10e for applying the drive voltage can be provided on a reflecting surface 30s and a reflecting surface 40s of the optical waveguide layer 20. When the drive voltage changes by input of a control signal from a not-illustrated control device, the refractive index of the optical waveguide layer 20 changes and the direction of emission of the light beam 22b to be emitted from the light emission surface 30es changes along X direction. In another example, the optical waveguide layer 20 contains a gas or a liquid, and an actuator to be deformed when the drive voltage is applied thereto can be fitted to the first mirror 30 and/or the second mirror 40. When the drive voltage changes by input of a control signal from a not-illustrated control device, the thickness of the optical waveguide layer 20 changes along with a change in clearance between the mirrors associated with deformation of the actuator, and the direction of emission of the light beam 22b to be emitted from the light emission surface 30es changes along X direction. As described above, the light deflection device 10 can change the direction of emission of the light beam 22b to be emitted from the light emission surface 30es along X direction in response to the control signal from outside. A thick line parallel to X direction in FIG. 1 represents a scanning direction of the light beam 22b.

An emission angle θ of the light emitted by the light deflection device 10 to the air is expressed by the following formula (1).

$$\sin\theta = \sqrt{n_w^2 - \left(\frac{m\lambda}{2d}\right)^2} \tag{1}$$

Here, the value $n_w$ is the refractive index of the optical waveguide layer 20, the value λ is a wavelength of the light in the air, the value d is the thickness of the optical waveguide layer 20, and the value m is the order. As apparent from formula (1), the direction of emission of the light can be changed by changing any of the value λ, the value $n_w$ and the value d.

The light projection apparatus 100 includes the not-illustrated control device that changes the refractive index and/or the thickness of the optical waveguide layer 20.

Details such as the principle of operation and method of operation of the optical deflector 10 are disclosed in U.S. Patent Application Publication No. 2018/0224709, the entire contents of which are incorporated in this specification by reference.

<Emission Angle and Spread Angle of Emitted Light>

A spread angle of the light emitted by the light deflection device 10 determines an energy density of a beam spot with which a target object is irradiated. The energy density of the beam spot is increased when the spread angle becomes smaller, and the energy density is reduced when the spread angle becomes larger. A description will be given below of a relation between a spread angle of light emitted from a conventional light deflection device 10 and an emission angle.

A far field pattern of the light emitted by the light deflection device 10 corresponds to Fourier transform of electric field distribution of the light emission surface 30es illustrated in FIG. 2. The light 22 propagates in the optical waveguide layer 20. Accordingly, when there exists the light deflection device 10 alone, the spread angle in Y direction of the emitted light at a long distance mainly depends on a width of the optical waveguide layer 20.

In the meantime, the spread angle in X direction of the emitted light at the long distance mainly depends on a propagation length of the light 22. In other words, the spread angle in X direction of the emitted light at the long distance (that is, the far field) becomes smaller as the propagation length of the light 22 propagating in the optical waveguide layer 20 is larger. On the other hand, the spread angle in X direction of the emitted light at the long distance (that is, the far field) becomes larger as the propagation length of the light 22 propagating in the optical waveguide layer 20 is smaller. Here, the propagation length means a distance at which an intensity of the light 22 propagating in the optical waveguide layer 20 while being attenuated is reduced to 1/e times. The value e is the base of natural logarithm. The spread angle means an angle $\Delta\theta$ that spreads to two sides from the emission angle $\theta$ as the center. To be more precise, the spread angle is described as a full width at half maximum of the emitted light in an angular spectrum.

In general, the spot of the emitted light at a long distance becomes close to a line shape in the case where the propagation length is larger than the width of the optical waveguide layer 20.

Figure 3A:
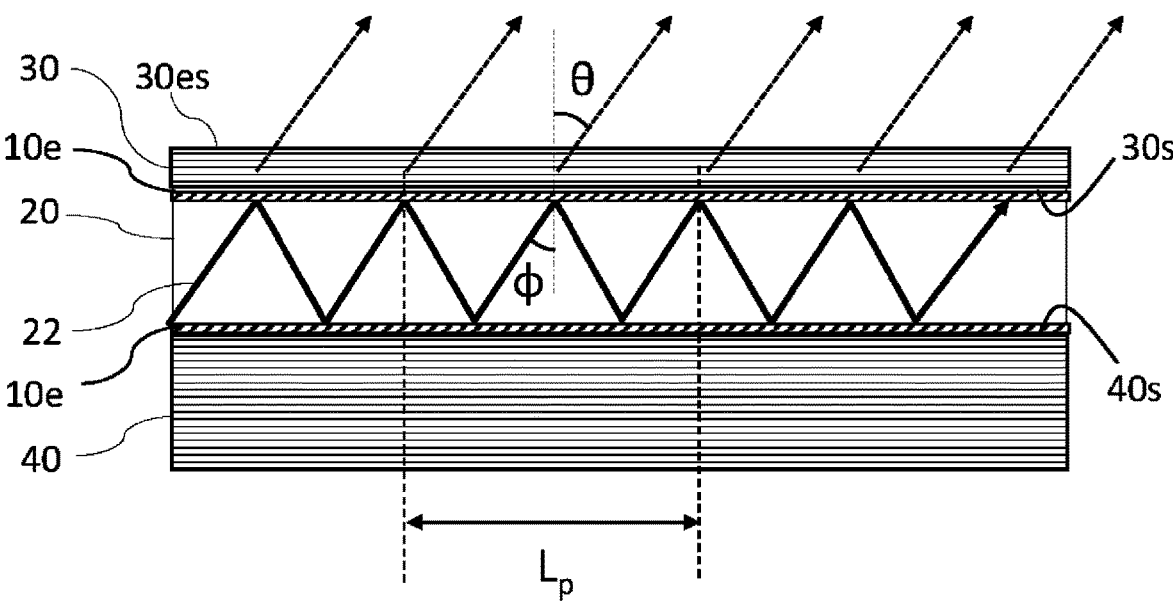
FIG. 3A is a diagram schematically illustrating how light is emitted from a light emission surface in a case where a propagation angle is relatively small.
Figure 3B:
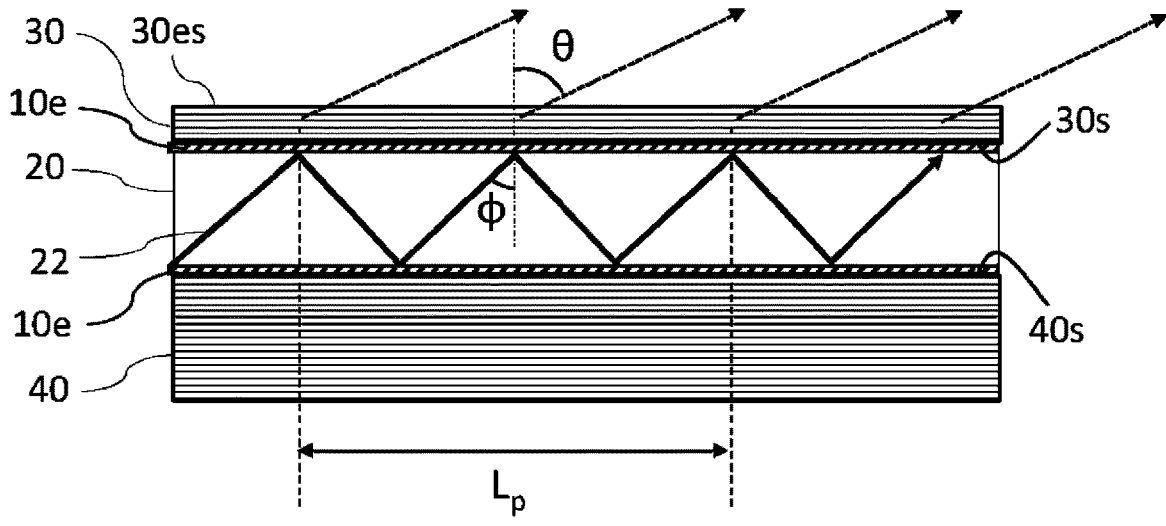
FIG. 3B is a diagram schematically illustrating how light is emitted from the light emission surface in a case where the propagation angle is relatively large.

FIGS. 3A and 3B are diagrams schematically illustrating how the light is emitted from the light emission surface 30es in a case where a propagation angle $\varphi$ is relatively small and in a case where the propagation angle $\varphi$ is relatively large, respectively. For the purpose of simplification, reflectance of each of the first mirror 30 and the second mirror 40 is assumed to be constant irrespective of the propagation angle $\varphi$. In the example illustrated in FIG. 3A, the number of times of reflection of the light 22 from the reflecting surface 30s and the reflecting surface 40s per unit length becomes larger since the propagation angle D is small. As a consequence, a propagation length $L_p$ becomes short. In the example illustrated in FIG. 3B, the number of times of reflection of the light 22 from the reflecting surface 30s and the reflecting surface 40s per unit length becomes smaller since the propagation angle $\varphi$ is large. As a consequence, the propagation length $L_p$ becomes large. Since there is a positive correlation between the propagation angle $\varphi$ and the emission angle $\theta$, the propagation length $L_p$ becomes larger as the emission angle $\theta$ is larger. Note that the propagation lengths $L_p$ indicated with arrows in FIGS. 3A and 3B are schematically illustrated and do not represent actual lengths thereof.

Figure 4:
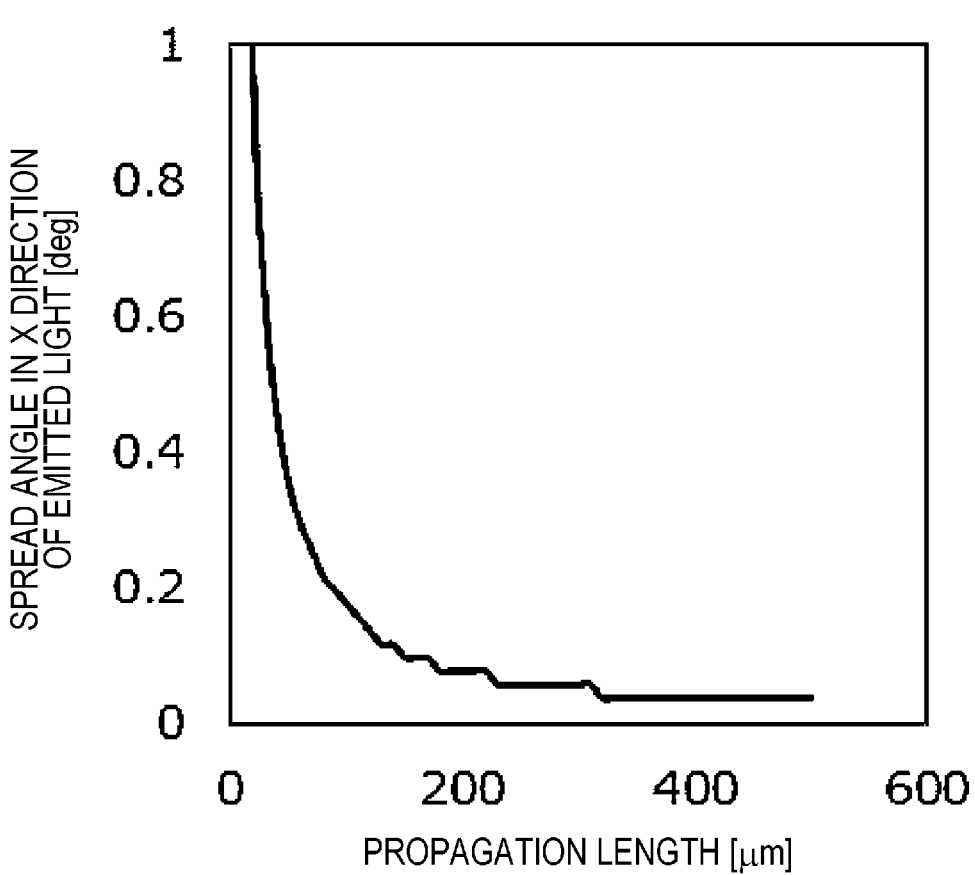
FIG. 4 is a graph depicting an example of a relation between a propagation length and a spread angle in X direction of emitted light.

FIG. 4 is a graph depicting an example of a relation between the propagation length $L_p$ and the spread angle $\Delta\theta$ in X direction of the emitted light. The graph depicted in FIG. 4 represents a result obtained by calculating, with varying propagation lengths, a line width of the light beam emitted from the single light deflection device 10 in which conditions such as the dimensions and dielectric constant of each constituent element are set as appropriate. As depicted in FIG. 4, the spread angle $\Delta\theta$ of the emitted light becomes smaller as the propagation length $L_p$ is larger. Since the propagation length $L_p$ is increased more along with the increase in emission angle $\theta$ as mentioned above, the spread angle $\Delta\theta$ of the emitted light is reduced along with the increase in emission angle $\theta$. Accordingly, it turns out that the spread angle $\Delta\theta$ of the emitted light changes along with the change in emission angle $\theta$.

The inventors have found out that an application of the above-mentioned phenomena to a light projection apparatus that performs scanning in a direction perpendicular to the ground surface makes it possible, with a relatively simple configuration, to increase a detectable distance to a target object located at a long distance and to suppress saturation of a detection signal of a target object located at a short distance. An embodiment of the present disclosure to be described below is based on this knowledge.

A light projection apparatus according to a first aspect is a light projection apparatus including a light deflection device. The light deflection device includes a first mirror and a second mirror which face each other and extend in a first direction, and an optical waveguide layer which is located between the first mirror and the second mirror, guides light in the first direction, and has a structure in which at least one of a refractive index or a thickness is capable of being changed. The first mirror has light transmissivity higher than light transmissivity of the second mirror and includes a light emission surface from which at least part of the light propagating in the optical waveguide layer is emitted outside. An emission angle of light to be emitted from the light emission surface of the first mirror is capable of being changed in a range from an emission angle $\theta_1$ to an emission angle $\theta_2$ being larger than the emission angle $\theta_1$ by at least one of the refractive index or the thickness of the optical waveguide layer being changed. The light deflection device is disposed such that first light emitted at the emission angle $\theta_1$ from the light emission surface is projected vertically downward relative to second light emitted at the emission angle $\theta_2$ from the light emission surface.

According to this light projection apparatus, it is possible to increase a detectable distance of a target object located at a long distance and to suppress saturation of a detection signal of a target object located at a short distance.

The light projection apparatus according to a second aspect, in the light projection apparatus according to the first aspect, further includes an optical element which is located on an optical path of the light to be emitted from the light emission surface of the first mirror and changes a direction of the light such that the first light is directed vertically downward relative to the second light.

According to this light projection apparatus, it is possible to direct the first light vertically downward relative to the second light by using the optical element.

In the light projection apparatus according to a third aspect, in the light projection apparatus according to the second aspect, the optical element refracts the light emitted from the light emission surface of the first mirror.

According to this light projection apparatus, it is possible to adjust a direction and/or a spread angle of the light emitted from the light emission surface by use of refraction of the light.

In the light projection apparatus according to a fourth aspect, in the light projection apparatus according to the third aspect, the optical element includes at least one lens which increases or reduces a spread angle of the light emitted from the light emission surface.

According to this light projection apparatus, it is possible to further suppress saturation of the detection signal of the target object located at the short distance by increasing the spread angle of the emitted light, and to further increase the detectable distance of the target object located at the long distance by reducing the spread angle of the emitted light.

In the light projection apparatus according to a fifth aspect, in the light projection apparatus according to the second aspect, the optical element reflects the light emitted from the light emission surface of the first mirror.

According to this light projection apparatus, it is possible to adjust the direction and/or the spread angle of the light emitted from the light emission surface by reflection of the light.

In the light projection apparatus according to a sixth aspect, in the light projection apparatus according to the fifth aspect, the optical element includes at least one mirror which increases or reduces a spread angle of the light emitted from the light emission surface.

According to this light projection apparatus, it is possible to further suppress saturation of the detection signal of the target object located at the short distance by increasing the spread angle of the emitted light, and to further increase the detectable distance of the target object located at the long distance by reducing the spread angle of the emitted light.

The light projection apparatus according to a seventh aspect, in the light projection apparatus according to any one of the first to sixth aspects, further includes a control device which changes at least one of the refractive index or the thickness of the optical waveguide layer.

According to this light projection apparatus, it is possible to adjust the direction of the light emitted from the light emission surface by causing the control device to change the refractive index and/or the thickness of the optical waveguide layer.

A moving body according to an eighth aspect includes the light projection apparatus according to any one of the first to seventh aspects. The light projection apparatus emits the light forward of the moving body from the light emission surface of the first mirror.

According to this moving body, it is possible to accurately obtain information on a target object located at a short distance such as the ground surface and on a target object located at a long distance such as a person. In the present specification, all or part of circuits, units, devices, members, and portions, as well as all or part of functional blocks in block diagrams can be implemented by one or more electronic circuits including any of semiconductor devices, semiconductor integrated circuits (ICs), and large scale integrations (LSIs), and the like. Such LSIs or ICs may be integrated on a single chip or may be formed by combining two or more chips. For example, functional blocks other than a storage element may be integrated on a single chip. Although such an integrated circuit is referred to as the LSI or the IC herein, the integrated circuit may be called by a different name depending on the degree of integration, and may be called a system LSI, a very large scale integration (VLSI), or an ultra large scale integration (ULSI). Meanwhile, a field programmable gate array (FPGA) that is programmed after manufacturing an LSI, or a reconfigurable logic device that enables reconfiguration of connecting relations inside an LSI or setup of circuit sections inside an LSI can also be used for the same purpose.

Moreover, all or part of functions or operations of the circuits, the units, the devices, the members, and the portions can be executed by software processing. In this case, software is stored in non-transitory storage media including one or more ROMs, optical discs, hard disk drives, and the like, and functions specified by the software are implemented by a processor and a peripheral device when the software is executed by the processor. A system or an apparatus may include one or more non-transitory storage media that store the software, the processor, and required hardware devices such as interfaces.

In the present disclosure, the "light" means not only visible light (with a wavelength which is greater than or equal to about 400 nm and smaller than or equal to about 700 nm), but also electromagnetic waves including ultraviolet rays (with a wavelength which is greater than or equal to about 10 nm and smaller than or equal to about 400 nm) and infrared rays (with a wavelength which is greater than or equal to about 700 nm and smaller than or equal to about 1 mm).

Now, a more specific embodiment of the present disclosure will be described below. However, explanations of unnecessary details may be omitted as appropriate. For example, detailed explanations of matters that have already been well known and overlapping explanations of substantially identical configurations may be omitted as the case may be. Such omission will be made in order to avoid redundancy of the following description and to facilitate the understanding by those skilled in the art. It is to be noted that the inventors are presenting the accompanying drawings and the following description in order to allow those skilled in the art to fully understand the present disclosure, and the drawings and the description are not intended to limit the scope of the subject matter as defined in the appended claims. In the following description, identical or similar constituents are denoted by the same reference signs.

(Embodiment)

Figure 5A:
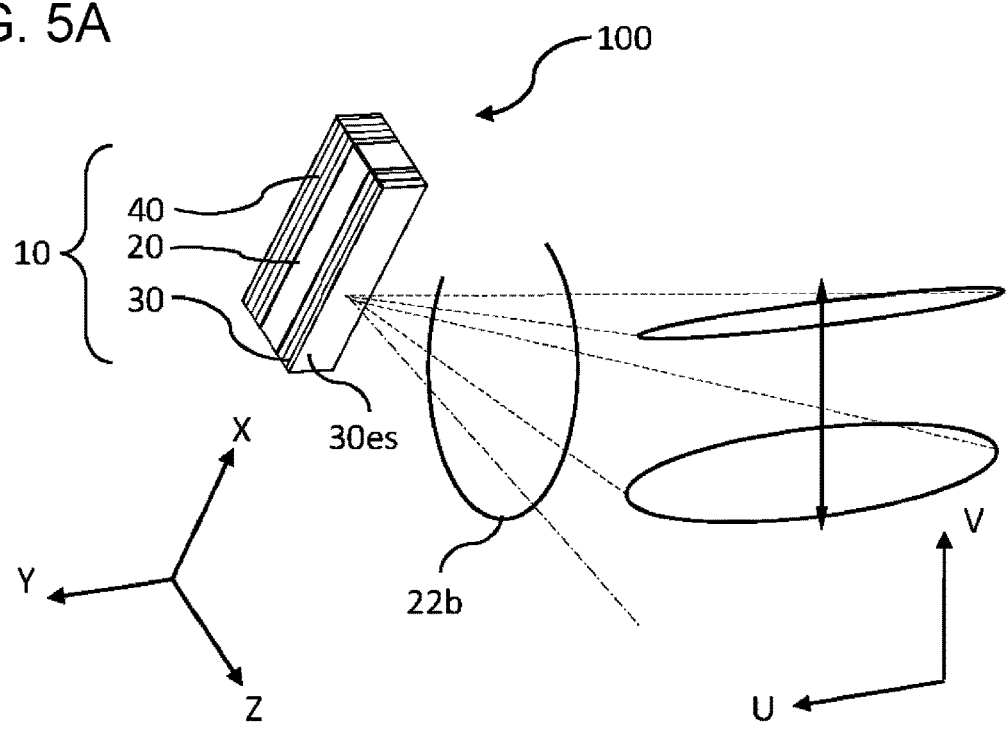
FIG. 5A is a perspective view schematically illustrating an example of a light projection apparatus according to an embodiment of the present disclosure.
Figure 5B:
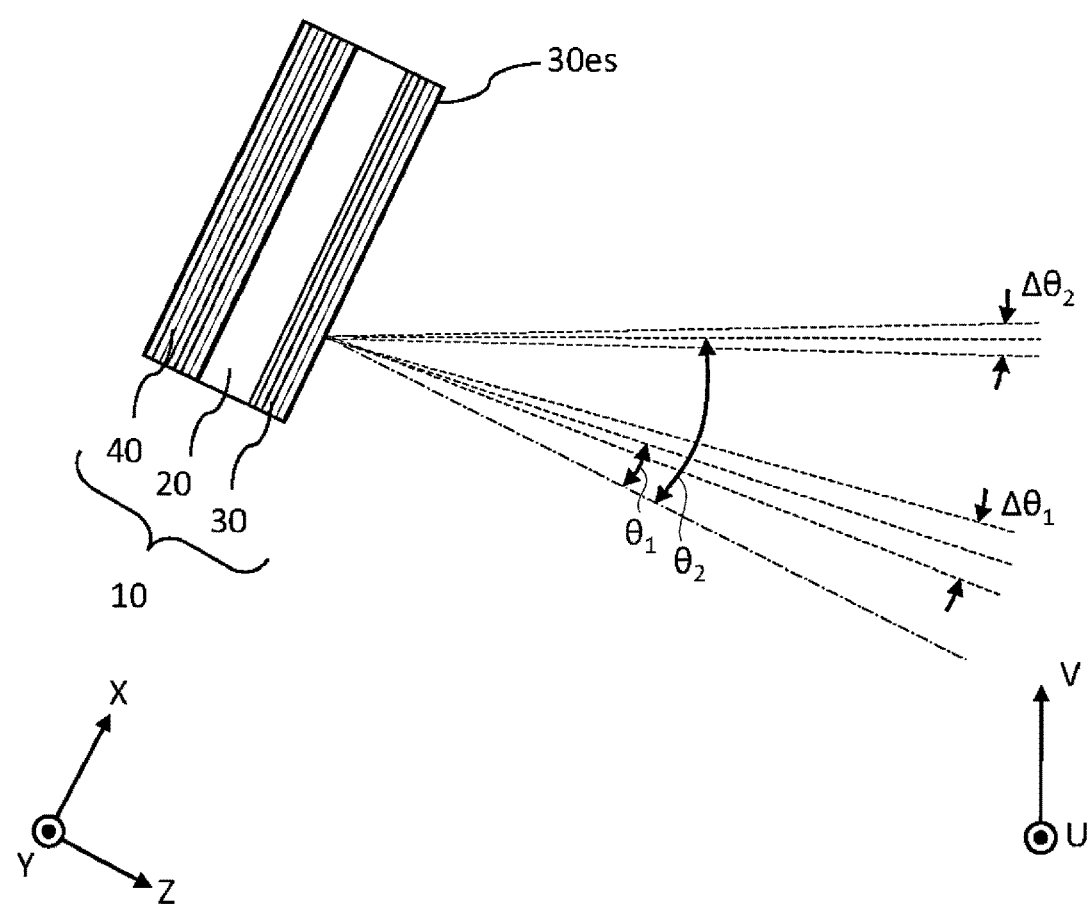
FIG. 5B is a side view schematically illustrating the example of the light projection apparatus according to the embodiment of the present disclosure.

First, a basic configuration example of a light projection apparatus according to an embodiment of the present disclosure will be described with reference to FIGS. 5A and 5B. FIG. 5A is a perspective view and FIG. 5B is a side view schematically illustrating an example of a light projection apparatus 100 according to the embodiment of the present disclosure. In addition to the X axis, the Y axis, and the Z axis mentioned above, FIGS. 5A and 5B also illustrate U axis and V axis which are orthogonal to each other. The U axis represents components parallel to the ground surface while the V axis represents components perpendicular to the ground surface. The U axis is parallel to the Y axis. The light projection apparatus 100 is located above the ground surface. Although a light beam 22b is emitted from a light emission surface 30es that has an area within a plane parallel to the XY plane in the microscopic sense, the light beam 22b is illustrated so as to be emitted from a single spot in order to simplify the description.

The light projection apparatus 100 according to the present embodiment includes at least one light deflection device 10. The light deflection device 10 has been described with reference to FIGS. 1 and 2. The above-described light source can include, for example, a semiconductor laser element. The wavelength of the light beam to be emitted by the light source can be appropriately selected depending on the use application. When measuring a distance to a target object by using infrared rays, the wavelength of the light beam can be, for example, greater than or equal to 700 nm and smaller than or equal to 2.5 µm. The wavelength of the light beam may be set to the wavelength of the visible light, which is greater than or equal to about 400 nm and smaller than or equal to about 700 nm. The wavelength of the light beam may be greater than or equal to 2.5 µm.

The light deflection device 10 is disposed such that a scanning direction thereof includes components in V direction. In the examples illustrated in FIGS. 5A and 5B, the light deflection device 10 is disposed such that the X axis is inclined relative to the V axis. The X axis is parallel to a direction of propagation of the light in the light deflection device 10. As illustrated in FIG. 5B, the light deflection device 10 performs scanning between an emission angle $\theta_1$ and an emission angle $\theta_2$ larger than the emission angle $\theta_1$. The light deflection device 10 is disposed such that the light emitted at the emission angle $\theta_1$ is projected vertically downward relative to the light emitted at the emission angle $\theta_2$. This means that the light from the light source is incident on the ground surface from an end surface on a lower side of the optical waveguide layer 20 in the layout illustrated in FIG. 5B. The term "vertically downward" corresponds to −V direction.

A scanning range is, for example, from the emission angle $\theta_1=5°$ to the emission angle $\theta_2=35°$. An angle formed between the light emission surface 30es and the V axis can be, for example, 35°. In this case, the light emitted at the emission angle $\theta_1$ is incident on the ground surface. Meanwhile, the light emitted at the emission angle $\theta_2$ propagates parallel to the ground surface.

When the light deflection device 10 is disposed as described above, the spread angle $\Delta\theta_1$ of the light emitted at the emission angle $\theta_1$ becomes larger than the spread angle $\Delta\theta_2$ of the light emitted at the emission angle $\theta_2$. In other words, the light emitted at the emission angle $\theta_1$ forms a relatively thick spot in X direction. Since V direction perpendicular to the ground surface includes the components in X direction which is parallel to the scanning direction, the light emitted in −V direction forms the relatively thick spot.

Figure 6:
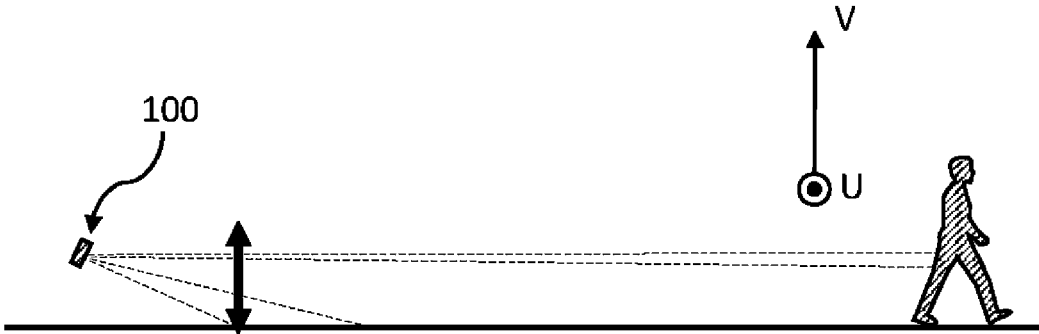
FIG. 6 is a diagram for explaining an operation of the light projection apparatus of the present embodiment to detect a target object located at a short distance or a long distance.

FIG. 6 is a diagram for explaining an operation of the light projection apparatus 100 of the present embodiment to detect a target object located at a short distance or a long distance. In the example illustrated in FIG. 6, the target object located at the short distance is the ground surface and the target object located at the long distance is a person. The scanning direction of the light emitted from the light projection apparatus 100 of the present embodiment is a direction perpendicular to the ground surface. The scanning direction of the light is indicated with a bold two-sided arrow. The light with which the ground surface or a portion near the ground surface is irradiated forms a relatively thick spot. In the case where the light projection apparatus 100 of the present embodiment irradiates the target object located at the short distance, an intensity of light reflected therefrom is increased more as compared to the case of the target object located at the long distance. There has been a problem that detection of the reflected light from the target object located at the short distance by using a photodetector or an image sensor causes saturation of a detection signal, thus leading to a failure to accurately obtain information on a distance, a shape, and the like concerning the target object located at the short distance.

Nonetheless, the light projection apparatus 100 according to the present embodiment can reduce the energy density of the light with which the target object located at the short distance is irradiated since the spot of the light becomes relatively thick in the case of scanning in −V direction. This makes it possible to suppress saturation of the detection signal by reducing the intensity of the reflected light, thereby obtaining the information on the target object located at the short distance more accurately.

On the other hand, in the case where the light projection apparatus 100 of the present embodiment irradiates the target object located at the long distance, the intensity of light reflected therefrom is reduced more as compared to the case of the target object located at the short distance. There has been a problem that an SNR of the detection signal is reduced more as the target object is located farther, thus leading to a failure to accurately obtain the information on the target object located at the long distance.

Nonetheless, the light projection apparatus 100 according to the present embodiment can increase the energy density of the light with which the target object located at the long distance is irradiated since the spot of the light becomes relatively thin in the case of scanning in +V direction. This makes it possible to suppress the reduction in SNR of the detection signal, thereby obtaining the information on the target object located at the long distance more accurately.

Meanwhile, it has not been easy to obtain the information on the target object located at the long distance accurately because the target object located at the long distance generally looks small in a detection image. However, according to the light projection apparatus 100 of the present embodiment, it is possible to form the thin spot of the light when irradiating the target object located at the long distance. Thus, a detection resolution is improved in terms of the direction perpendicular to the ground surface, and the information on the target object located at the long distance can be obtained more accurately.

(Modified Examples)

Next, first to sixth modified examples of the light projection apparatus 100 according to the present embodiment will be described with reference to FIGS. 7A to 12. Although the constituents are illustrated separately from each other in FIGS. 7A to 12 in order to facilitate the understandings, these constituents may be in contact with each other.

Figure 7A:
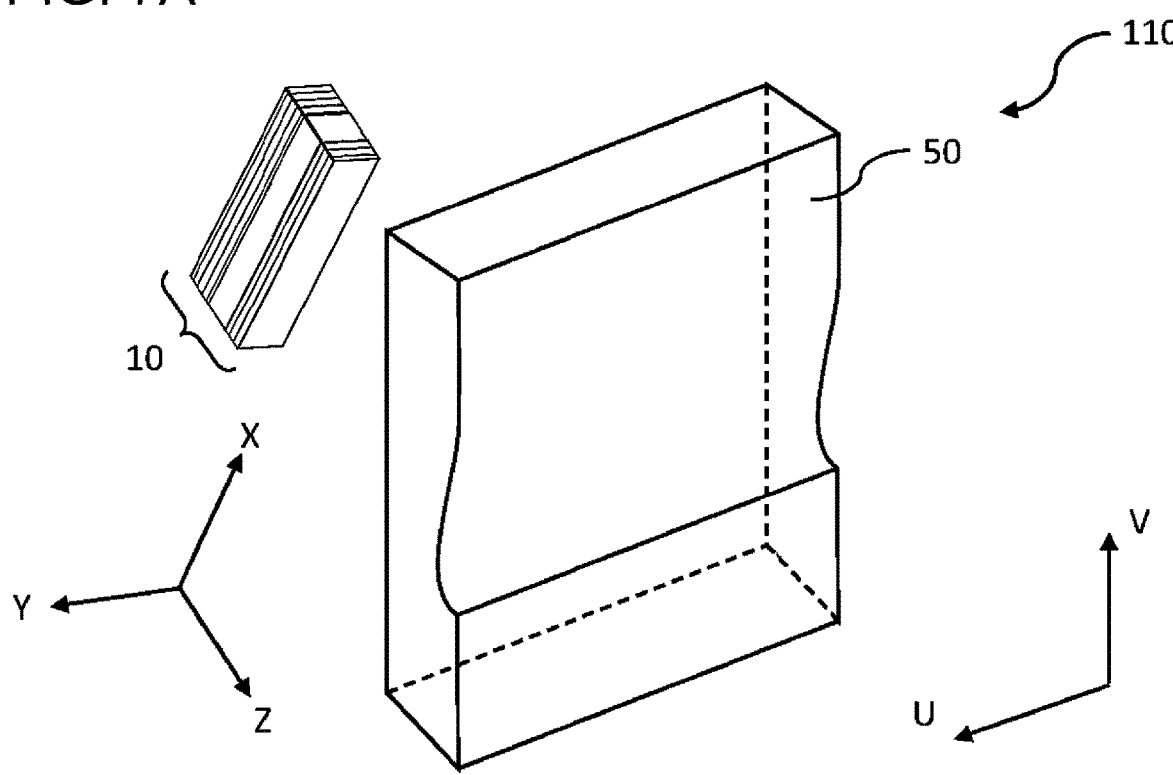
FIG. 7A is a perspective view schematically illustrating an example of a light projection apparatus according to a first modified example of the present embodiment.
Figure 7B:
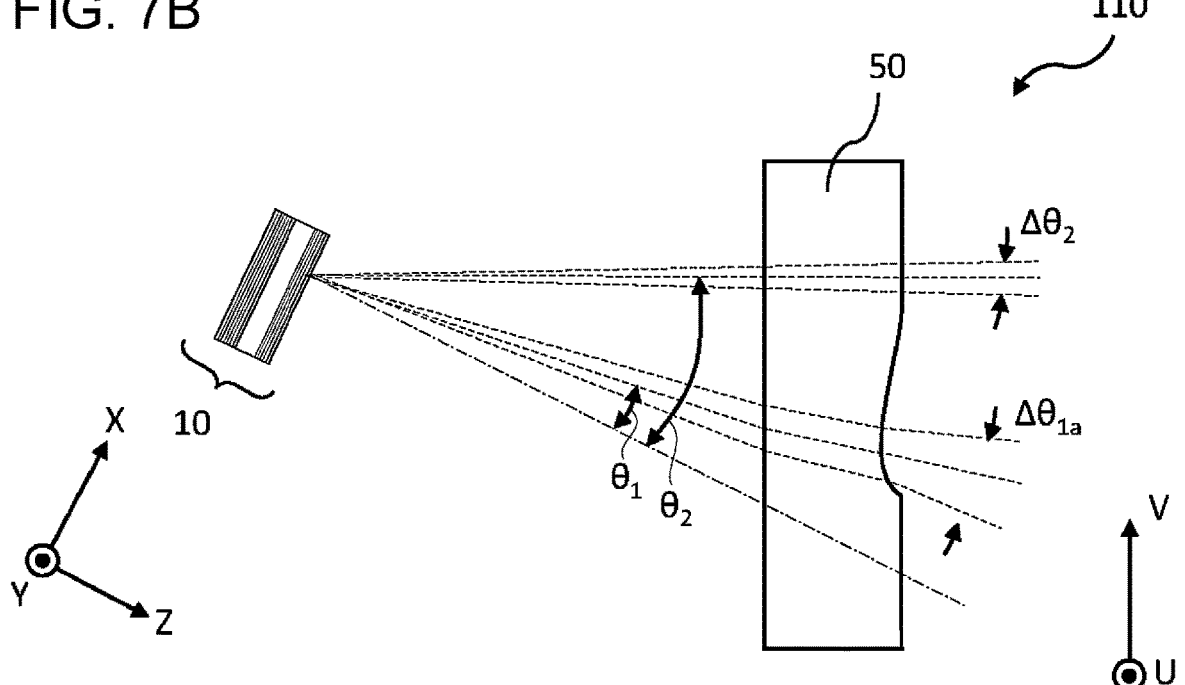
FIG. 7B is a diagram of a configuration illustrated in FIG. 7A, which is viewed in −Y direction.

FIG. 7A is a perspective view schematically illustrating an example of a light projection apparatus 110 according to the first modified example of the present embodiment. FIG. 7B is a diagram of a configuration illustrated in FIG. 7A, which is viewed in −Y direction. The light projection apparatus 110 according to the first modified example is different from the light projection apparatus 100 according to the present embodiment in that an optical element 50 is located on an optical path of the light to be emitted from the light emission surface 30*es* of the light deflection device 10. The optical element 50 can refract the light emitted from the light emission surface 30*es* of the light deflection device 10.

In the example illustrated in FIG. 7B, the optical element 50 includes a cylindrical concave lens which has a curvature in a predetermined direction at least including a component in X direction. This concave lens can increase the curvature in −X direction at least within a light scanning range. A curvature radius of the concave lens can be, for example, greater than or equal to 1 mm and smaller than or equal to 100 mm. The spread angle in X direction of the light emitted by the light deflection device 10 at the emission angle $\theta_1$ is increased to a value $\Delta\theta_{1A}$ by the optical element 50. Thus, the energy density of the light with which the target object located at the short distance is irradiated can be reduced further. As a consequence, it is possible to reduce the intensity of the reflected light and to suppress saturation of the detection signal, thereby obtaining the information on the target object located at the short distance more accurately.

Figures 8A, 8B:
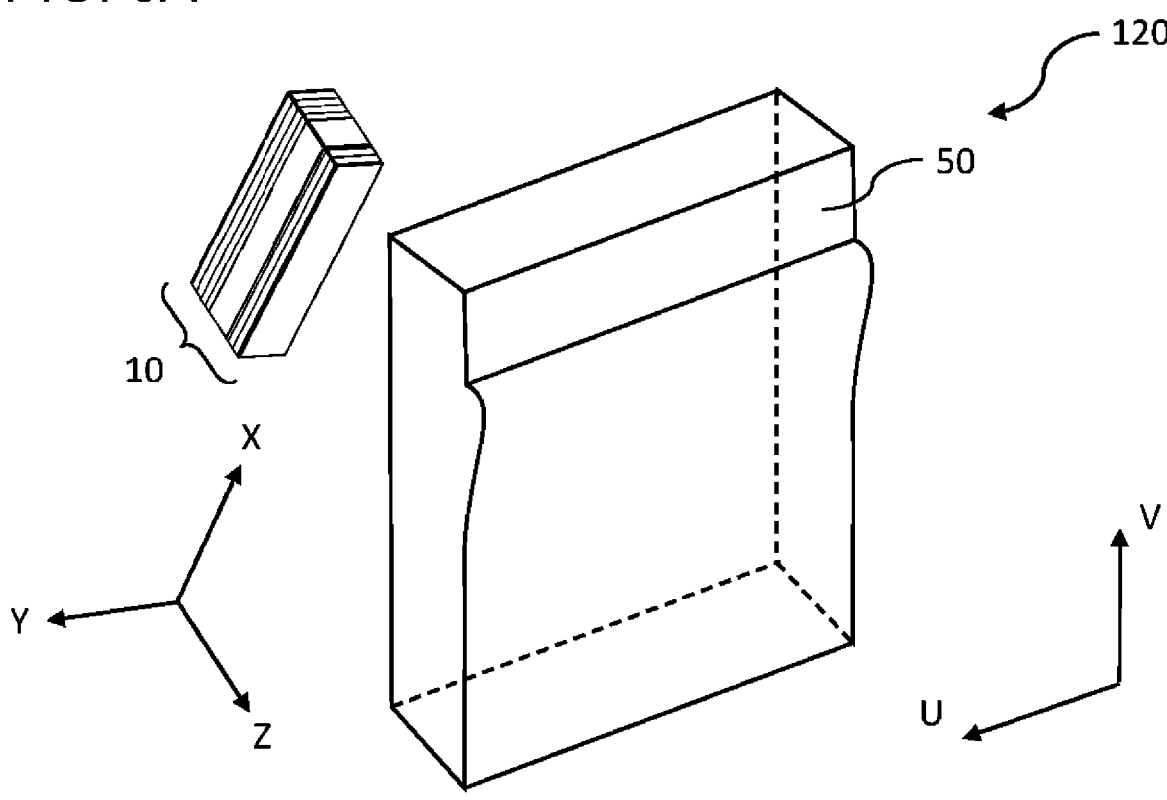
FIG. 8A is a perspective view schematically illustrating an example of a light projection apparatus according to a second modified example of the present embodiment.
FIG. 8B is a diagram of a configuration illustrated in FIG. 8A, which is viewed in −Y direction.

FIG. 8A is a perspective view schematically illustrating an example of a light projection apparatus 120 according to the second modified example of the present embodiment. FIG. 8B is a diagram of a configuration illustrated in FIG. 8A, which is viewed in −Y direction. The light projection apparatus 120 according to the second modified example is different from the light projection apparatus 110 according to the first modified example in that the optical element 50 includes a cylindrical convex lens which has a curvature in a predetermined direction at least including a component in X direction. This convex lens can increase the curvature in +X direction at least within the light scanning range. A curvature radius of the convex lens can be, for example, greater than or equal to 1 mm and smaller than or equal to 100 mm. The spread angle in X direction of the light emitted by the light deflection device 10 at the emission angle $\theta_2$ is reduced to a value $\Delta\theta_{2B}$ by the optical element 50. Thus, the energy density of the light with which the target object located at the long distance is irradiated can be increased. As a consequence, it is possible to suppress the reduction in SNR of the detection signal, thereby obtaining the information on the target object located at the long distance more accurately.

Figure 9A:
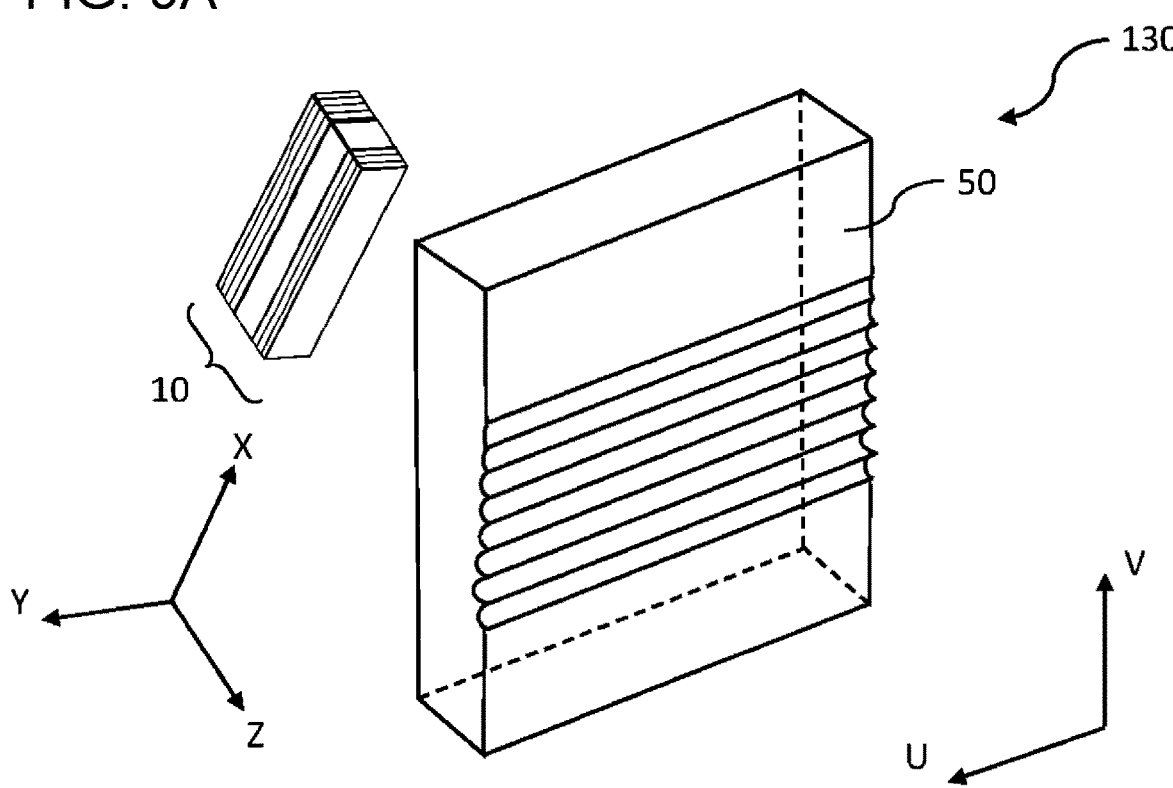
FIG. 9A is a perspective view schematically illustrating an example of a light projection apparatus according to a third modified example of the present embodiment.
Figure 9B:
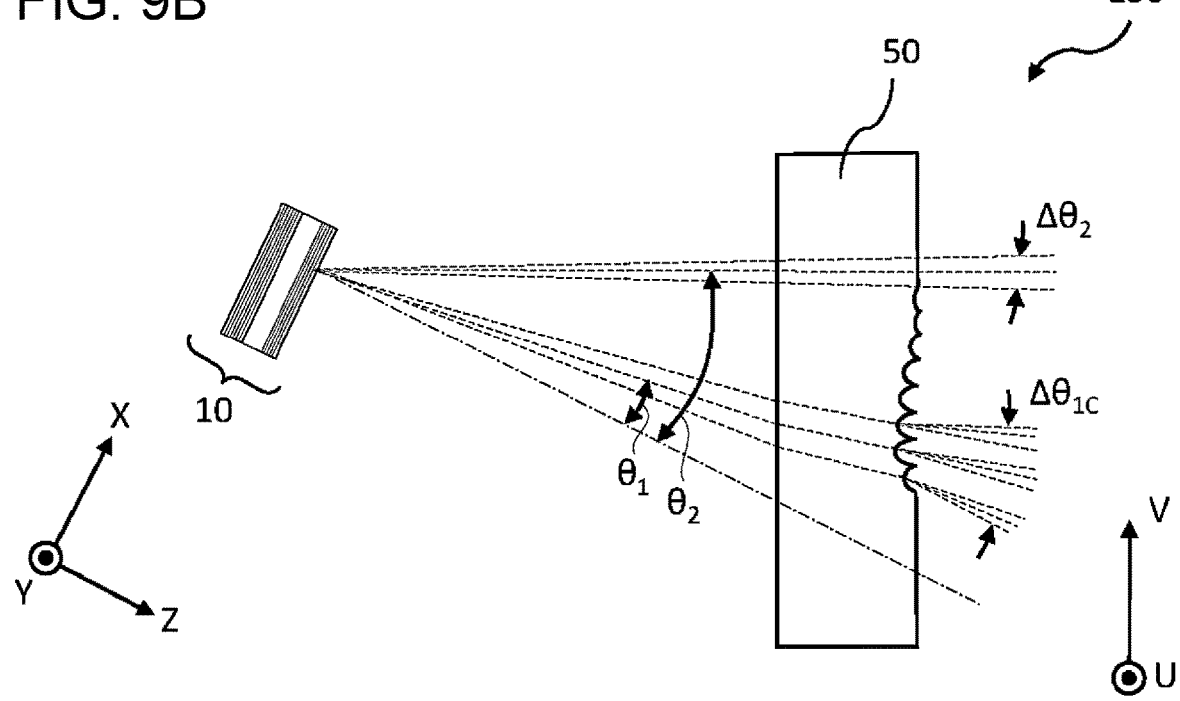
FIG. 9B is a diagram of a configuration illustrated in FIG. 9A, which is viewed in −Y direction.

FIG. 9A is a perspective view schematically illustrating an example of a light projection apparatus 130 according to the third modified example of the present embodiment. FIG. 9B is a diagram of a configuration illustrated in FIG. 9A, which is viewed in −Y direction. The light projection apparatus 130 according to the third modified example is different from the light projection apparatus 110 according to the first modified example in that the optical element 50 includes a lens array provided with multiple concave lenses. The multiple concave lenses are arranged in a predetermined direction at least including a component in X direction. This lens array covers at least part of the light scanning range. A curvature radius of each concave lens may be increased in –X direction at least within the light scanning range. Thus, it is possible to obtain the information on the target object located at the short distance more accurately as with the above-described first modified example.

The layout of the light deflection device 10 in the first to third modified examples is the same as the layout in the present embodiment. The spot of the light emitted by the light deflection device 10 becomes thick when scanning in –V direction and becomes thin when scanning in +V direction. The concave lens having the small curvature radius can realize an effect of further thickening the spot of light with which the target object located at the short distance is irradiated. The convex lens having the small curvature radius can realize an effect of further thinning the spot of light with which the target object located at the long distance is irradiated. The light projection apparatuses 110 to 130 of the first to third modified examples can be manufactured easily.

Meanwhile, although the optical element 50 in each of the first to third modified examples is disposed perpendicularly to the ground surface, the optical element 50 may be inclined thereto instead. In the meantime, any of the lenses may be provided on an incident surface of the optical element 50 instead of an outgoing surface, or may be provided both on the incident surface and the outgoing surface thereof.

Figure 10A:
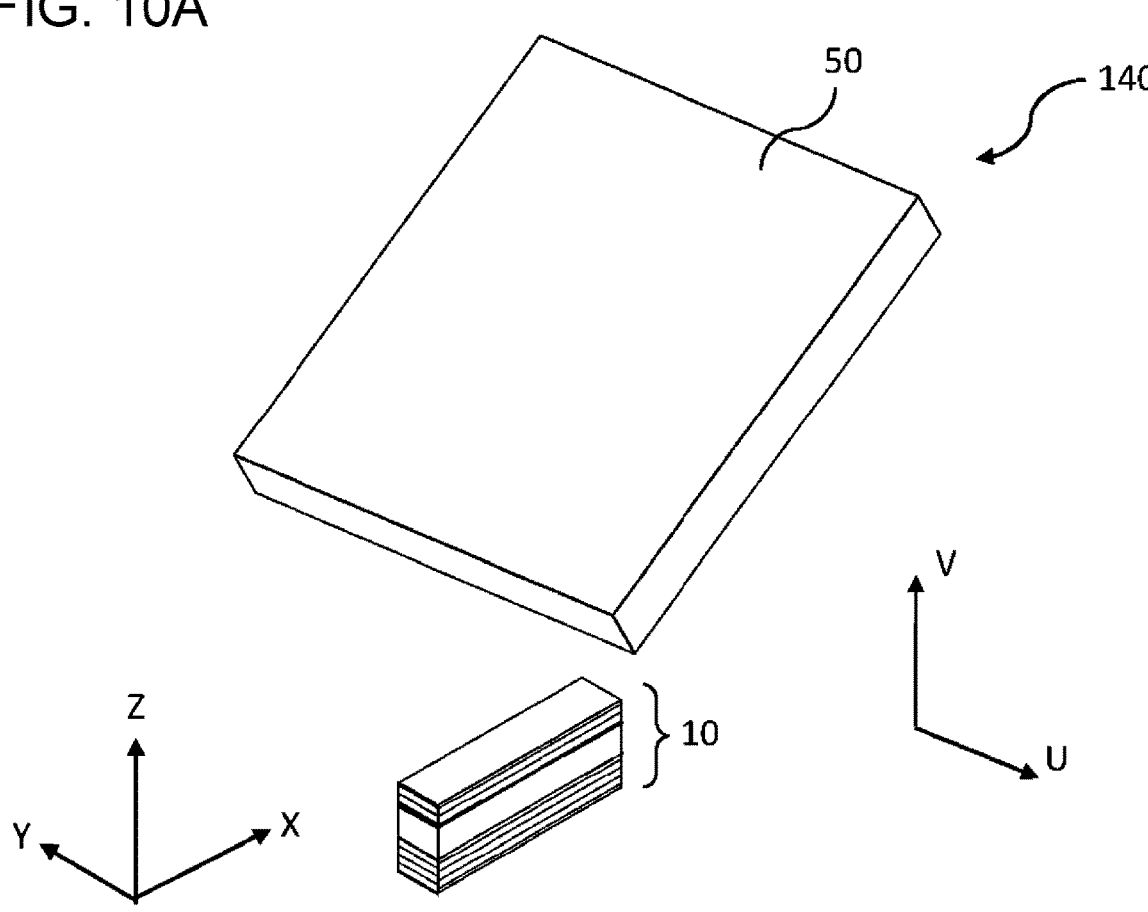
FIG. 10A is a perspective view schematically illustrating an example of a light projection apparatus according to a fourth modified example of the present embodiment.
Figure 10B:
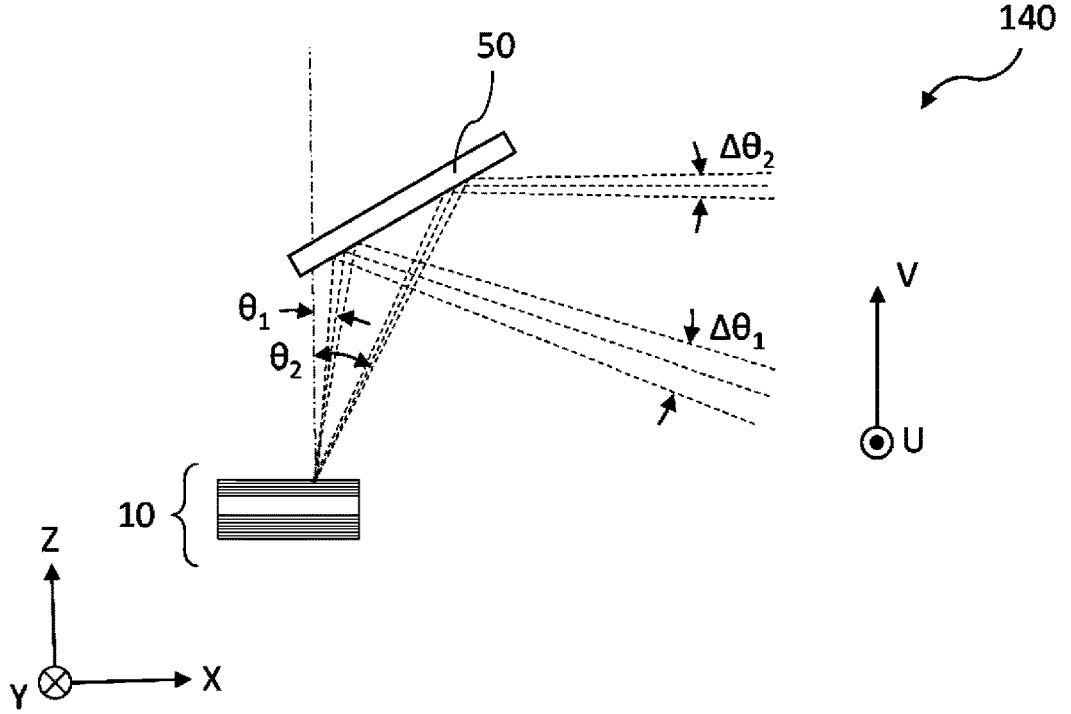
FIG. 10B is a diagram of a configuration illustrated in FIG. 10A, which is viewed in +Y direction.

FIG. 10A is a perspective view schematically illustrating an example of a light projection apparatus 140 according to the fourth modified example of the present embodiment. FIG. 10B is a diagram of a configuration illustrated in FIG. 10A, which is viewed in +Y direction. The light projection apparatus 140 according to the fourth modified example is different from the light projection apparatus 110 according to the first modified example in that the optical element 50 includes a mirror. In this fourth modified example, the light deflection device 10 does not have to be disposed in strict consideration of the emission angle of the light. In other words, it is possible to increase the degree of layout freedom of the light deflection device 10, so that the light projection apparatus 140 according to the fourth modified example can be manufactured more easily than the light projection apparatuses 110 to 130 of the first to third modified examples. In the meantime, if the light deflection device 10 is laid out with an error, it is still possible to project the light in a desired direction by fine-tuning the layout of the mirror included in the optical element 50. For example, when the light deflection device 10 is laid out at a position turned by $\psi°$ relative to the Y axis from a predetermined position, it is possible to compensate for such a displacement of the projection angle by turning the mirror by an angle of $(\psi/2)°$ relative to the Y axis.

Figure 11A:
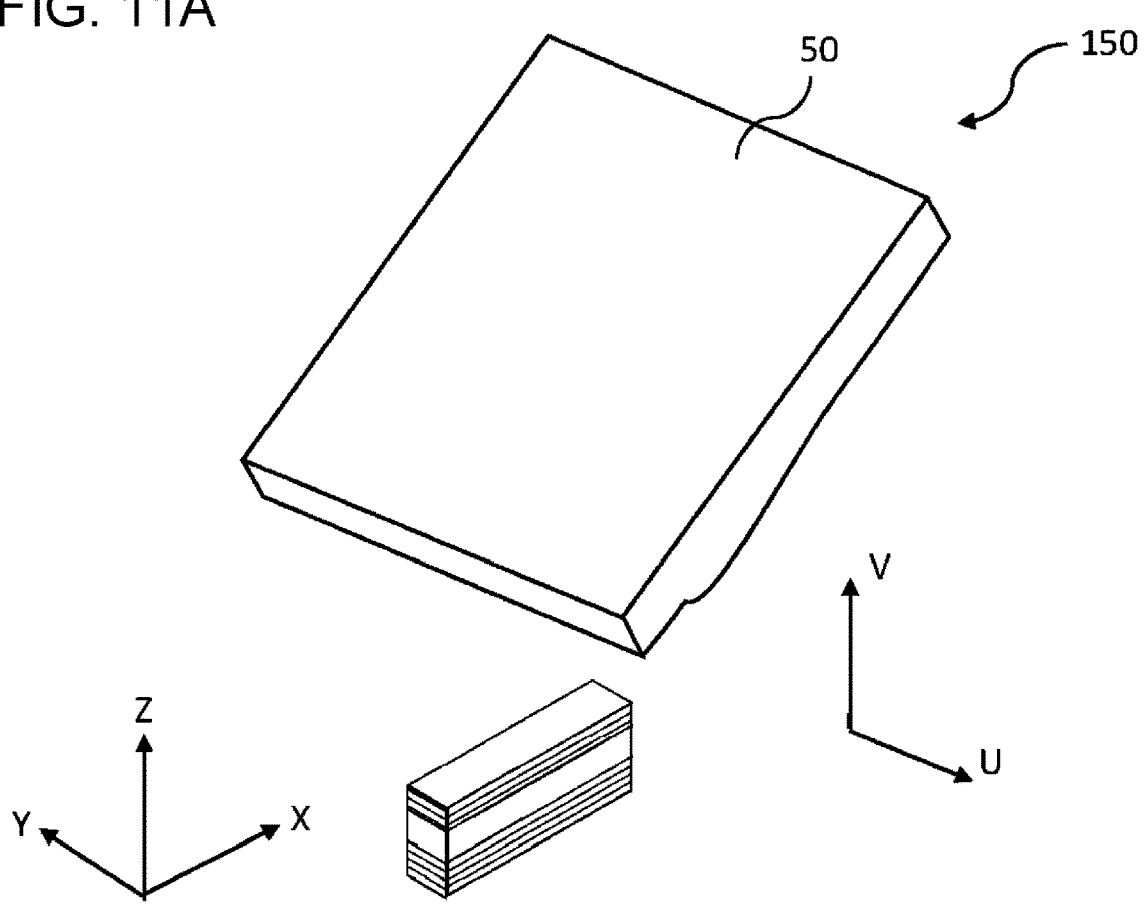
FIG. 11A is a perspective view schematically illustrating an example of a light projection apparatus according to a fifth modified example of the present embodiment.
Figure 11B:
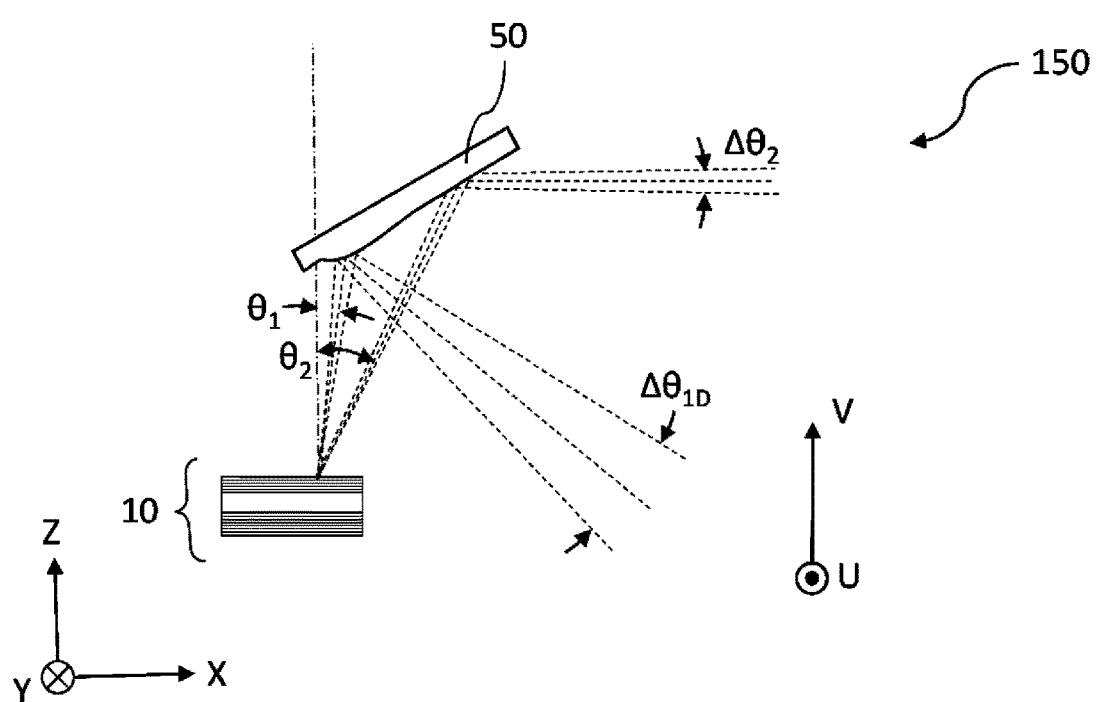
FIG. 11B is a diagram of a configuration illustrated in FIG. 11A, which is viewed in +Y direction.

FIG. 11A is a perspective view schematically illustrating an example of a light projection apparatus 150 according to the fifth modified example of the present embodiment. FIG. 11B is a diagram of a configuration illustrated in FIG. 11A, which is viewed in +Y direction. The light projection apparatus 150 according to the fifth modified example is different from the light projection apparatus 140 according to the fourth modified example in that the optical element 50 includes a cylindrical convex mirror having a curvature in a predetermined direction at least including a component in X direction. According to this convex mirror, a curvature radius can be increased in –X direction at least within the light scanning range. A curvature radius of the convex mirror can be, for example, greater than or equal to 1 mm and smaller than or equal to 100 mm. The spread angle in X direction of the light emitted by the light deflection device 10 at the emission angle $\theta_1$ is increased to a value $\Delta\theta_{1D}$ by the optical element 50. Thus, it is possible not only to increase the layout freedom of the light deflection device 10 but also to obtain the information on the target object located at the short distance more accurately.

Figure 12:
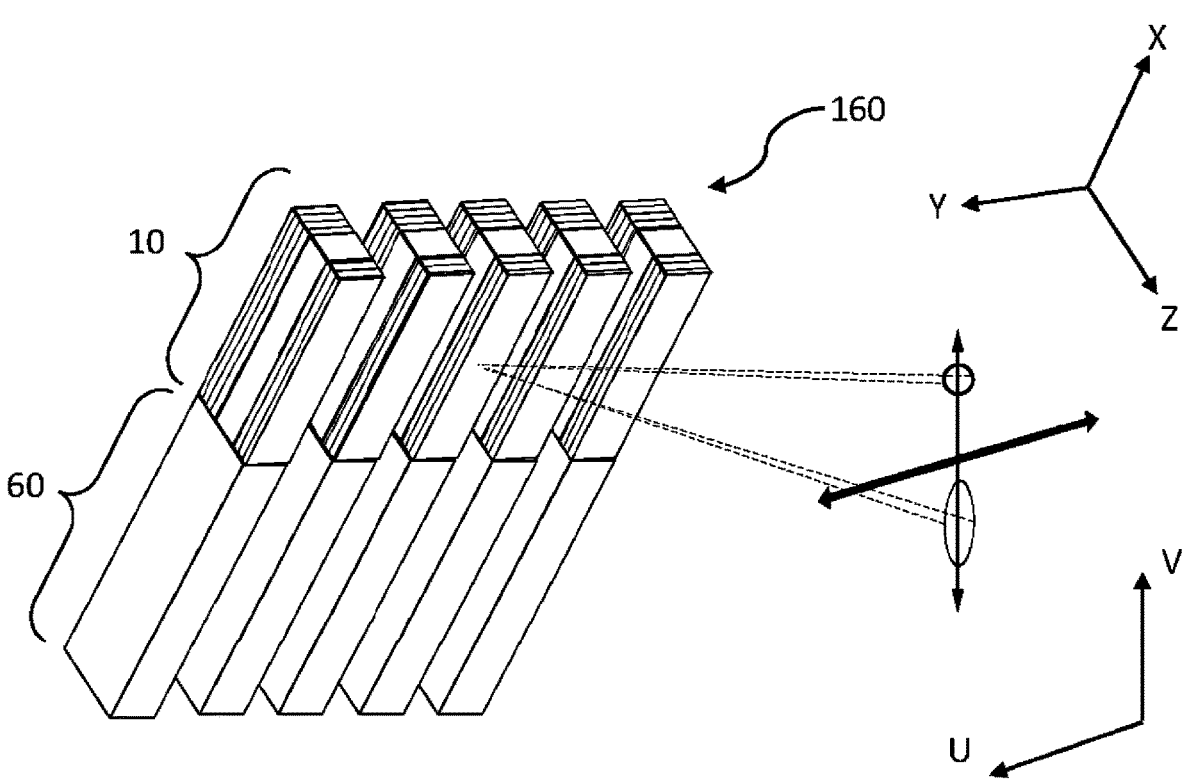
FIG. 12 is a perspective view schematically illustrating an example of a light projection apparatus according to a sixth modified example of the present embodiment.

FIG. 12 is a perspective view schematically illustrating an example of a light projection apparatus 160 according to the sixth modified example of the present embodiment. The light projection apparatus 160 according to the sixth modified example is different from the light projection apparatus 100 according to the present embodiment in that multiple light deflection devices 10 are arranged in Y direction. Multiple phase shifters 60 are connected to the multiple light deflection devices 10, respectively. The number of the light deflection devices 10 may be, for example, greater than or equal to 8 pieces and smaller than or equal to 64 pieces. In the light projection apparatus 160 according to the sixth modified example, the light beam is formed by interference of light emitted from each of the light deflection devices 10. While it may be possible to say that the light beam is emitted from a wide light emission surface including the multiple light emission surfaces 30es, FIG. 12 is illustrated such that the light is emitted from one point as with the embodiment and the modified examples described above in order to simplify the description. In the example illustrated in FIG. 12, a width in Y direction of the light beam can be smaller than those in the above-described examples, because the size in Y direction of the above-mentioned wide light emission surface is larger than the size in Y direction of the light emission surface 30es in any of the above-described examples.

Each phase shifter 60 can have a configuration to change its refractive index depending on a change in drive voltage to be applied thereto. In one example, the phase shifter 60 can be formed from a thermo-optic material in which the refractive index is changed depending on a change in temperature. The phase shifter 60 includes a not-illustrated heater for changing the temperature of the thermo-optic material. The not-illustrated heater is provided with two electrodes through which to apply the drive voltage. In a different example, the phase shifter 60 can be formed from an electro-optic material in which the refractive index is changed depending on a change in drive voltage. The phase shifter 60 is provided with two electrodes through which to apply the drive voltage to the electro-optic material. When the drive voltage is changed by input of a control signal from the not-illustrated control device, the refractive index of the phase shifter 60 is changed so as to change the phase of the light passing through the phase shifter 60. In the light projection apparatus 160 according to the sixth modified example, the drive voltage is changed in response to the control signal, whereby the phases of the light incident on the light deflection devices 10 from the phase shifters 60, respectively, are changed by a constant amount for each of the light deflection devices 10 in the order of arrangement thereof. This phase shift can change the direction of emission of the light beam in Y direction. Thus, the light can perform two-dimensional scanning on UV plane.

Figure 13A:
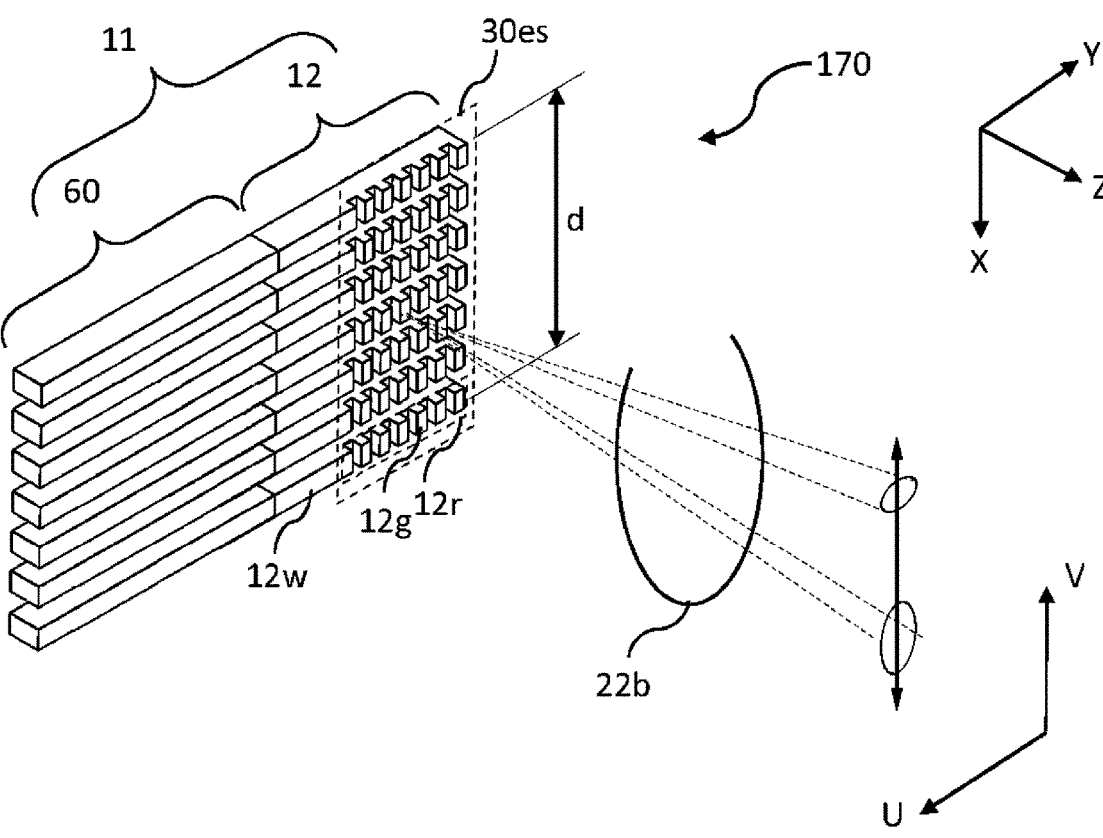
FIG. 13A is a perspective view schematically illustrating an example of a light projection apparatus according to a seventh modified example of the present embodiment.

FIG. 13A is a perspective view schematically illustrating an example of a light projection apparatus 170 according to a seventh modified example of the present embodiment. The light projection apparatus 170 according to the seventh modified example is different from the light projection apparatus 100 according to the present embodiment in that a light deflection device 11 is formed form multiple optical wave guides 12 arranged in X direction, and multiple phase shifters 60 connected to the multiple optical wave guides 12, respectively. Each of the optical wave guides 12 includes an optical waveguide region 12w that guides the light, and a light emission region 12r from which the light is emitted. Meanwhile, each of the light emission regions 12r is provided with a grating 12g. According to the above-described configuration, the light emitted from the light emission surface 30es can perform scanning in V direction. Instead of the grating 12g, the light emission region 12r may be formed from two mirrors and an optical waveguide layer provided therebetween as with the light deflection device 10 of the above-described embodiment. The above-described configuration makes it possible to perform the light scanning also in U direction in addition to V direction.

The light propagates in the optical waveguide region 12w in Y direction and is emitted outside from the light emission region 12r as multiple diffraction rays parallel to YZ plane, which are attributed to diffraction caused by the grating 12g. A length in Y direction of the light emission region 12r can be, for example, greater than or equal to 1 μm and smaller or equal to 10 μm. The number of cavities in the grating 12g can be set, for example, greater than or equal to 4 pieces and smaller than or equal to 16 pieces. A length in Y direction of the cavities per cycle in the grating 12g, or in other words, a duty ratio thereof may be changed as appropriate depending on the depth and the number of the cavities in the grating. According to the light deflection device 11 of the seventh modified example, the light beam is formed by interference of light emitted from the multiple optical wave guides 12. While it may be possible to say that the light beam is emitted from the light emission surface 30es that includes the multiple gratings 12g, FIG. 13A is illustrated such that the light is emitted from one point as with the embodiment and the modified examples described above in order to simplify the description.

As with the sixth modified example, each phase shifter 60 can have the configuration to change its refractive index depending on the change in drive voltage to be applied thereto. When the drive voltage is changed by input of the control signal from the not-illustrated control device, the refractive index of the phase shifter 60 is changed so as to change the phase of the light passing through the phase shifter 60. In the light projection apparatus 170 according to the seventh modified example, the drive voltage is changed in response to the control signal, whereby the phases of the light incident on the optical wave guides 12 from the phase shifters 60, respectively, are changed by a constant amount for each of the optical wave guides 12 in the order of arrangement thereof. This phase shift can change the direction of emission of the light beam in V direction.

Figure 13B:
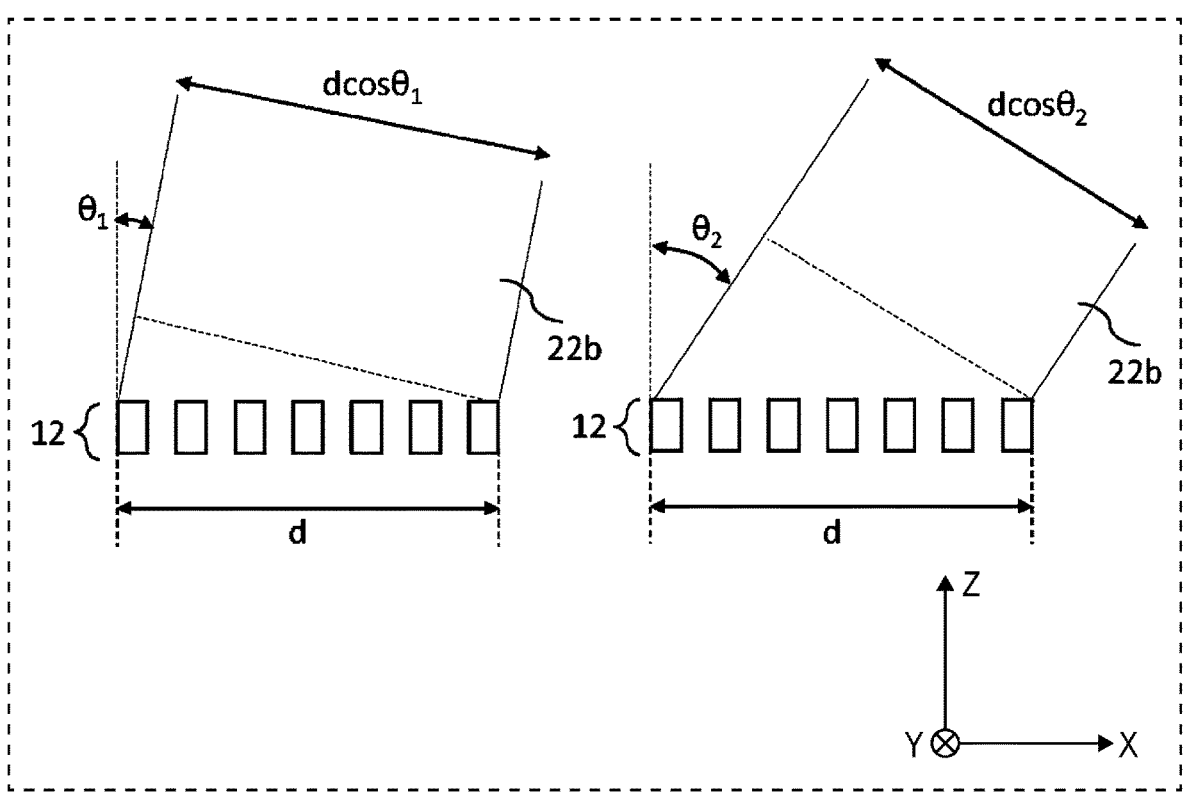
FIG. 13B is a diagram of a configuration illustrated in FIG. 13A, which is viewed in +Y direction.

The width of the spot in V direction in the seventh modified example depends on the width of the light beam 22b at an emitting portion in the light emission region 12r. FIG. 13B is a diagram illustrating a relation between the light beam 22b emitted from the multiple optical wave-guides and the emission angle in the microscopic sense (that is, in a mode in which the beam having a certain width is emitted instead of the beam from one point). A diagram on the left in FIG. 13B illustrates a case where the emission angle is $\theta_1$, and a diagram on the right in FIG. 13B illustrates a case where the emission angle is $\theta_2$ which is larger than the emission angle $\theta_1$. Here, the emission angle that is perpendicular to the light emission surface 30es is assumed to be zero degrees. As illustrated in FIG. 13B, the width of the light beam 22b at the emitting portion when viewed in the direction of emission depends on the emission angle θ. When the width of the light emission region is defined as a value d, the width of the light beam 22b at the emitting portion is expressed by d cos θ. In other words, the direction in X direction of the light beam at the emitting portion when viewed in the direction of emission becomes smaller as the emission angle is larger. Accordingly, the width in V direction of the spot at a long distance (that is, the far field) becomes larger as the emission angle is larger.

The light projection apparatus 170 can change the emission angle of the light to be emitted from the light emission surface 30es in the range from the emission angle $\theta_1$ to the emission angle $\theta_2$, which is larger than the emission angle $\theta_1$, by causing the phase shifters 60 to change the phase of the light. The light projection apparatus 170 is disposed such that first light emitted at the angle emission angle $\theta_1$ from the light emission surface 30es is projected vertically downward relative to second light emitted at the emission angle $\theta_2$ from the light emission surface 30es. In this way, it is possible to suppress saturation of the detection signal by reducing the intensity of the reflected light, thereby obtaining the information on the target object located at the short distance more accurately as with the above-described embodiment.

In the first to seventh modified examples described above, it is possible to say that the optical element 50 changes the direction of the light such that the light emitted at the emission angle $\theta_1$ from the light emission surface 30es is directed vertically downward relative to the light emitted at the emission angle $\theta_2$ therefrom. The optical element 50 can emit the light that is incident on the optical element 50 at a different angle from the angle of incidence on the optical element 50.

Besides the above-described examples, in the light projection apparatus 120 according to the second modified example, the optical element 50 may include a lens array provided with multiple convex lenses. The multiple convex lenses may be arranged in a predetermined direction at least including a component in X direction. In this case, it is possible to increase the energy density of the light with which the target object located at the long distance is irradiated. This makes it possible to suppress the reduction in SNR of the detection signal, thereby obtaining the information on the target object located at the long distance more accurately.

Meanwhile, in the light projection apparatus 150 according to the fifth modified example, the convex mirror for the light at the emission angle $\theta_1$ may be replaced with a concave mirror for the light at the emission angle $\theta_2$. Alternatively, the concave mirror for the light at the emission angle $\theta_2$ may be provided in addition to the convex mirror for the light at the emission angle $\theta_1$. In these cases, it is possible to obtain the information on the target object located at the long distance more accurately. The optical element 50 may include two or more mirrors arranged in a predetermined direction at least including a component in X direction.

(Application Examples)

Next, a first application example and a second application example of the light projection apparatus 100 according to the present embodiment will be described with reference to FIGS. 14A to 15.

Figure 14A:
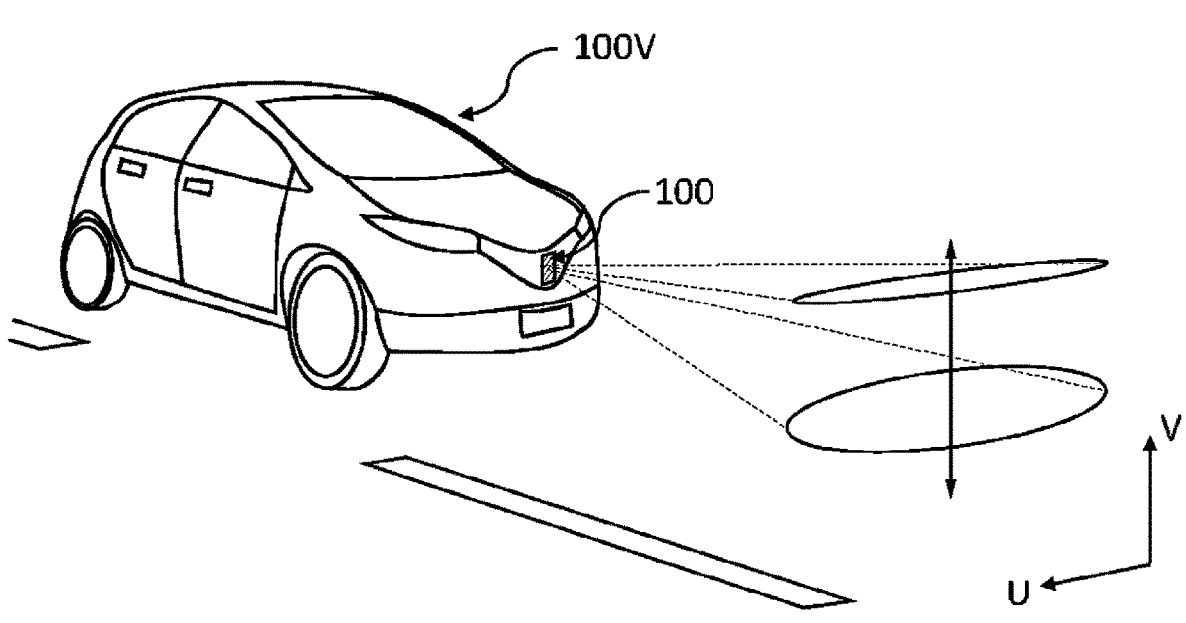
FIG. 14A is a perspective view schematically illustrating a first application example in which the light projection apparatus according to the present embodiment is mounted on a vehicle.
Figure 14B:
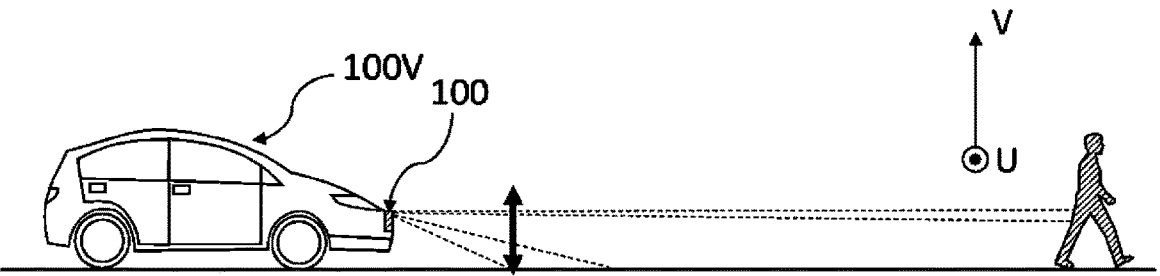
FIG. 14B is a side view schematically illustrating the first application example in which the light projection apparatus according to the present embodiment is mounted on the vehicle.

FIG. 14A is a perspective view and FIG. 14B is a side view schematically illustrating a first application example in which the light projection apparatus 100 according to the present embodiment is mounted on a vehicle 100V. In the example illustrated in FIG. 14A, the vehicle 100V includes the light projection apparatus 100 on a front face thereof. The light projection apparatus 100 emits the light forward. The light projection apparatus 100 can be mounted on a moving body as mentioned above. For example, the moving body may be a ship, a train, or the like instead of the vehicle 100V. In the example illustrated in FIG. 14B, the vehicle 100V can accurately obtain information on the ground surface located at a short distance and on a person located at a long distance. A driver of the vehicle 100V can drive safely by accurately figuring out the immediate environment from this information.

Figure 15:
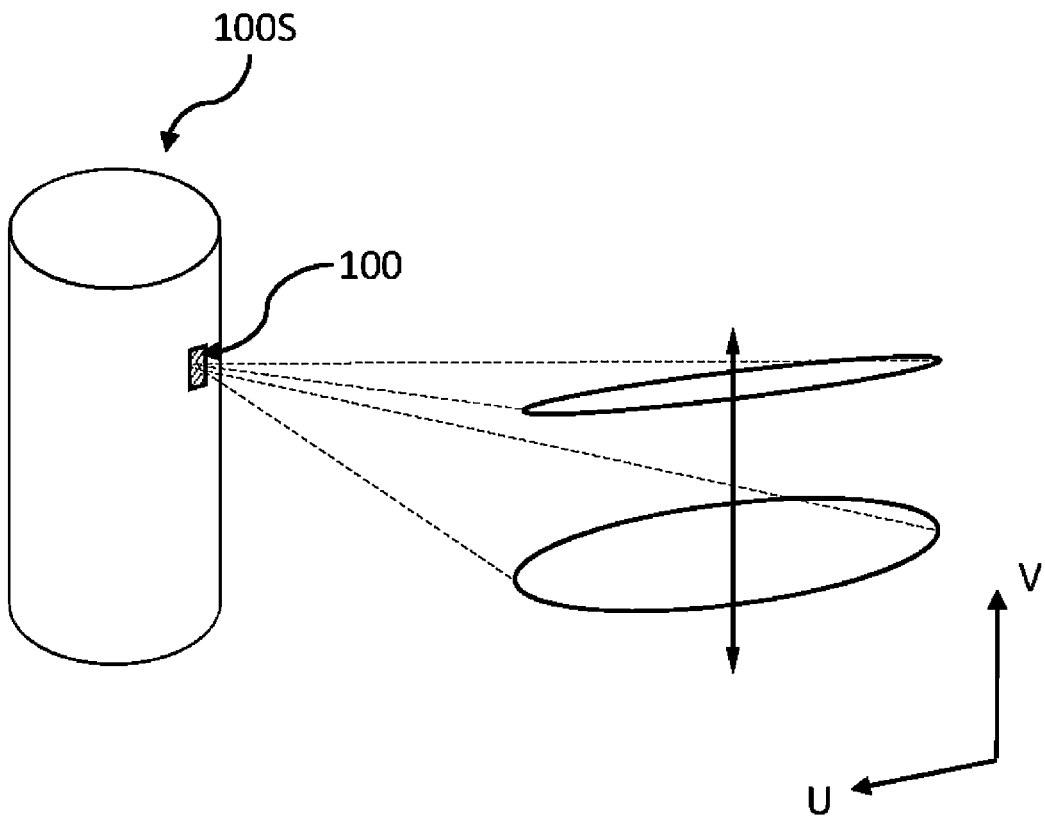
FIG. 15 is a perspective view schematically illustrating a second application example in which the light projection apparatus according to the present embodiment is mounted on a monitoring system.

FIG. 15 is a perspective view schematically illustrating a second application example in which the light projection apparatus 100 according to the present embodiment is mounted on a monitoring system 100S. The monitoring system 100S has a columnar shape in the example illustrated in FIG. 15. The monitoring system 100S includes the light projection apparatus 100 on a side face thereof. The monitoring system 100S may take on any shape. The monitoring system 100S can be installed at a construction or around the construction. A person inside the construction can accurately figure out the presence of a prowler or an unidentified object around the construction by using the information on target objects located at a short distance and at a long distance obtained from the monitoring system 100S.

The light projection apparatus according to the present disclosure can be used for applications as typified by a LiDAR system to be mounted on a moving body such as a vehicle, an automated guided vehicle (AGV), a ship, and a train, or on a flight vehicle such as an unmanned aerial vehicle (UAV). The light projection apparatus is also applicable to a monitoring system to be installed at a construction, and so forth.

What is claimed is:

1. A light projection apparatus comprising
a light deflection device including
    a first mirror and a second mirror which face each other and extend in a first direction, and
    an optical waveguide layer which is located between the first mirror and the second mirror, guides light in the first direction, and has a structure in which at least one of a refractive index or a thickness is configured to be changed, wherein
the first mirror has light transmissivity higher than light transmissivity of the second mirror and includes a light emission surface from which at least part of the light propagating in the optical waveguide layer is emitted outside,
an emission angle of light to be emitted from the light emission surface of the first mirror is configured to be changed in a range from an emission angle $\theta_1$ to an emission angle $\theta_2$ being larger than the emission angle $\theta_1$ by at least one of the refractive index or the thickness of the optical waveguide layer being changed,
the light deflection device is disposed such that first light emitted at the emission angle $\theta_1$ from the light emission surface is projected vertically downward relative to second light emitted at the emission angle $\theta_2$ from the light emission surface,
a first spread angle of the first light is greater than a second spread angle of the second light, and
a difference between the first spread angle and the second spread angle in a vertical direction is greater than a difference between the first spread angle and the second spread angle in a horizontal direction.

2. The light projection apparatus according to claim 1, further comprising:
an optical element which is located on an optical path of the light to be emitted from the light emission surface of the first mirror and changes a direction of the light such that the first light is directed vertically downward relative to the second light.

3. The light projection apparatus according to claim 2, wherein the optical element reflects the light emitted from the light emission surface of the first mirror.

4. The light projection apparatus according to claim 3, wherein the optical element includes at least one mirror which increases or reduces a spread angle of the light emitted from the light emission surface.

5. The light projection apparatus according to claim 1, wherein the optical element refracts the light emitted from the light emission surface of the first mirror.

6. The light projection apparatus according to claim 1, further comprising:
an optical element which is located on an optical path of the light to be emitted from the light emission surface of the first mirror and includes at least one lens which increases the difference between the first spread angle and the second spread angle in the vertical direction.

7. The light projection apparatus according to claim 1, further comprising:
a control device which changes at least one of the refractive index or the thickness of the optical waveguide layer.

8. A moving body comprising
the light projection apparatus according to claim 1, wherein
the light projection apparatus emits the light forward of the moving body from the light emission surface of the first mirror.

9. A light projection apparatus comprising
a light deflection device, wherein
the light deflection device
    includes a light emission surface,
    emits light in a direction intersecting with the light emission surface, and
    is configured to change an emission angle along a first direction of the light to be emitted from the light emission surface in a range from a first angle to a second angle being larger than the first angle,
the light deflection device is disposed such that one light out of first light emitted at the first angle from the light emission surface and second light emitted at the second angle from the light emission surface, the one light having a larger width in the first direction at a long distance than another light out of the first light and the second light, is projected vertically downward relative to other light, and
a difference between a width of the first light and a width of the second light in the first direction is greater than a difference between a width of the first light and a width of the second light in a direction perpendicular to the first direction.

10. A light projection apparatus comprising
a light deflection device, wherein
the light deflection device includes
    a plurality of optical waveguides arranged in a first direction and each extending in a second direction, and a plurality of phase shifters each connected to corresponding one of the plurality of optical waveguides, the light deflection device is configured to change an emission angle along the first direction of light to be emitted from a light emission surface in a range from an emission direction angle $\theta_1$ to an emission direction angle $\theta_2$ being larger than the emission direction angle $\theta_1$, the light emission surface being parallel to the first direction and the second direction, the light deflection device is disposed such that first light emitted at the emission direction angle $\theta_2$ from the light emission surface is projected vertically downward relative to second light emitted at the emission direction angle $\theta_1$ from the light emission surface, a first spread angle of the first light is greater than a second spread angle of the second light, and a difference between the first spread angle and the second spread angle in a vertical direction is greater than a difference between the first spread angle and the second spread angle in a horizontal direction.

* * * * *